(12) United States Patent
Nielsen et al.

(10) Patent No.: US 12,301,784 B2
(45) Date of Patent: May 13, 2025

(54) DISPLAY DEVICE ON/OFF DETECTION METHODS AND APPARATUS

(71) Applicant: The Nielsen Company (US), LLC, New York, NY (US)

(72) Inventors: Christen V. Nielsen, Palm Harbor, FL (US); Dan Nelson, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/494,478

(22) Filed: Oct. 25, 2023

(65) Prior Publication Data

US 2024/0080436 A1 Mar. 7, 2024

Related U.S. Application Data

(63) Continuation of application No. 18/092,030, filed on Dec. 30, 2022, now Pat. No. 11,831,863, which is a continuation of application No. 17/164,483, filed on Feb. 1, 2021, now Pat. No. 11,546,579, which is a continuation of application No. 16/706,280, filed on Dec. 6, 2019, now Pat. No. 10,911,749, which is a continuation of application No. 16/417,128, filed on May 20, 2019, now Pat. No. 10,506,226, which is a continuation of application No. 16/166,871, filed on Oct. 22, 2018, now Pat. No. 10,306,221, which is a continuation of application No. 15/958,814, filed on Apr. 20, 2018, now Pat. No. 10,110,889, which is a continuation of application No. 15/207,019, filed on Jul. 11, 2016, now Pat. No. 9,961,342, which is a continuation of application No. 14/015,664, filed on Aug. 30, 2013, now Pat. No. 9,420,334, which is a
(Continued)

(51) Int. Cl.
*H04N 17/04* (2006.01)
*H04H 60/32* (2008.01)
*H04N 21/439* (2011.01)

(52) U.S. Cl.
CPC ............ *H04N 17/04* (2013.01); *H04H 60/32* (2013.01); *H04N 21/4394* (2013.01)

(58) Field of Classification Search
CPC ..... H04N 17/04; H04N 21/4394; H04H 60/32
See application file for complete search history.

(56) References Cited

U.S. PATENT DOCUMENTS

2004/0181799 A1* 9/2004 Lu .......................... H04H 60/37
725/18

OTHER PUBLICATIONS

United States Patent and Trademark Office, Non-Final office action, issued in connection with U.S. Appl. No. 18/785,639, mailed on Sep. 18, 2024, 7 pages.

* cited by examiner

*Primary Examiner* — David L Ton

(57) ABSTRACT

Display device ON/OFF detection methods and apparatus are disclosed. Example display activity detectors disclosed herein are to extract regions from respective ones of captured video frames, the regions corresponding to a depiction of a display of a monitored media device Disclosed example display activity detectors are also to compute a distance metric that is to represent an amount a first one of the regions of a first one of the captured video frames differs from a corresponding second one of the regions of a second one of the captured video frames. Disclosed example display activity detectors are further to compare the distance metric to a threshold to determine whether the monitored media device is ON or OFF.

20 Claims, 27 Drawing Sheets

Related U.S. Application Data continuation of application No. 12/831,870, filed on Jul. 7, 2010, now Pat. No. 8,526,626, which is a continuation of application No. 11/576,328, filed as application No. PCT/US2006/031960 on Aug. 16, 2006, now Pat. No. 7,882,514.

(60) Provisional application No. 60/761,678, filed on Jan. 24, 2006, provisional application No. 60/708,557, filed on Aug. 16, 2005.

DISPLAY DEVICE ON/OFF DETECTION METHODS AND APPARATUS

CROSS-REFERENCE TO RELATED APPLICATIONS

This patent arises from a continuation of U.S. patent application Ser. No. 18/092,030 now U.S. Pat. No. 11,831,863, titled "Display Device On/Off Detection Methods And Apparatus," filed on Dec. 30, 2022, which is a continuation of U.S. patent application Ser. No. 17/164,483 (now U.S. Pat. No. 11,546,579), titled "Display Device ON/OFF Detection Methods and Apparatus," filed on Feb. 1, 2021, which is a continuation of U.S. patent application Ser. No. 16/706,280 (now U.S. Pat. No. 10,911,749), titled "Display Device ON/OFF Detection Methods and Apparatus," filed on Dec. 6, 2019, which is a continuation of U.S. patent application Ser. No. 16/417,128 (now U.S. Pat. No. 10,506,226), titled "Display Device ON/OFF Detection Methods and Apparatus," filed on May 20, 2019, which is a continuation of U.S. patent application Ser. No. 16/166,871 (now U.S. Pat. No. 10,306,221), titled "Display Device ON/OFF Detection Methods and Apparatus," filed on Oct. 22, 2018, which is a continuation of U.S. patent application Ser. No. 15/958,814 (now U.S. Pat. No. 10,110,889), titled "Display Device ON/OFF Detection Methods and Apparatus," filed on Apr. 20, 2018, which is a continuation of U.S. patent application Ser. No. 15/207,019 (now U.S. Pat. No. 9,961,342), titled "Display Device ON/OFF Detection Methods and Apparatus," filed on Jul. 11, 2016, which is a continuation of U.S. patent application Ser. No. 14/015,664 (now U.S. Pat. No. 9,420,334), titled "Display Device ON/OFF Detection Methods and Apparatus," filed on Aug. 30, 2013, which is a continuation of U.S. patent application Ser. No. 12/831,870 (now U.S. Pat. No. 8,526,626), titled "Display Device ON/OFF Detection Methods and Apparatus," filed on Jul. 7, 2010, which is a continuation of U.S. patent application Ser. No. 11/576,328 (now U.S. Pat. No. 7,882,514), titled "Display Device ON/OFF Detection Methods and Apparatus," filed on Mar. 29, 2007, which is a U.S. national stage of International Patent Application No. PCT/US2006/031960, titled "Display Device ON/OFF Detection Methods and Apparatus," filed on Aug. 16, 2006, which claims the benefit of U.S. Provisional Application No. 60/708,557, titled "Display Device ON/OFF Detection Methods and Apparatus" and filed on Aug. 16, 2005, and U.S. Provisional Application No. 60/761,678, titled "Display Device ON/OFF Detection Methods and Apparatus" and filed on Jan. 24, 2006. Priority to U.S. Provisional Application No. 60/708,557, U.S. Provisional Application No. 60/761,678, International Application No. PCT/US2006/031960, U.S. patent application Ser. No. 11/576,328, U.S. patent application Ser. No. 12/831,870, U.S. patent application Ser. No. 14/015,664, U.S. patent application Ser. No. 15/207,019, U.S. patent application Ser. No. 15/958,814, U.S. patent application Ser. No. 16/166,871, U.S. patent application Ser. No. 16/417,128, U.S. patent application Ser. No. 16/706,280, U.S. patent application Ser. No. 17/164,483 and U.S. patent application Ser. No. 18/092,030 are hereby claimed. U.S. Provisional Application No. 60/708,557, U.S. Provisional Application No. 60/761,678, International Application No. PCT/US2006/031960, U.S. patent application Ser. No. 11/576,328, U.S. patent application Ser. No. 12/831,870, U.S. patent application Ser. No. 14/015,664, U.S. patent application Ser. No. 15/207,019, U.S. patent application Ser. No. 15/958,814, U.S. patent application Ser. No. 16/166,871, U.S. patent application Ser. No. 16/417,128, U.S. patent application Ser. No. 16/706,280, U.S. patent application Ser. No. 17/164,483 and U.S. patent application Ser. No. 18/092,030 are hereby incorporated by reference in their respective entireties.

FIELD OF THE DISCLOSURE

This disclosure relates generally to audience measurement and, more particularly, to display device ON/OFF detection methods and apparatus.

BACKGROUND

Media ratings and metering information is typically generated by collecting viewing records and/or other media consumption information from a group of statistically selected households. Each of the statistically selected households typically has a data logging and processing unit commonly referred to as a "home unit." In households having multiple viewing sites (e.g., multiple television systems or, more generally, multiple presentation devices), the data logging and processing functionality may be distributed among a single home unit and multiple "site units," one site unit for each viewing site. The home unit (or the combination of the home unit and the site unit) is often in communication with a variety of attachments that provide inputs to the home unit or receive outputs from the metering unit. For example, a frequency detector attachment coupled with the home unit may be in communication with a television to sense a local oscillator frequency of the television tuner. In this manner, the frequency detector attachment may be used by the home unit to determine the channel to which the television is currently tuned based on a detected frequency. As another example, a people meter may be located in the viewing space of the television and in communication with the home unit, thereby enabling the home unit to detect the identities and/or number of the persons currently viewing programs displayed on the television. Additional devices may be provided, for example, to determine if the television is operating (i.e., is turned ON) and/or the channel to which the television is tuned.

In addition, building security and building monitoring systems are becoming more and more prevalent in today's society. Such systems enable the building owner to determine the status of various electronic appliances disposed in the building even when the building owner is located remotely from the building premises. In many instances, the building owner may desire to know the operating status, e.g., ON/OFF, of a particular appliance, such as a television, or other media delivery/presentation device.

In another setting, parents often have an interest in monitoring their children's television viewing habits, electronic gaming habits and computer usage habits. A component of monitoring such habits involves determining the operating status of the appliance, electronic device, etc. of interest.

Media monitoring systems, building monitoring systems and parenting tools such as those described above, are only three (of many) applications in which an ON/OFF detection apparatus/device has use.

DETAILED DESCRIPTION

Figure 1:
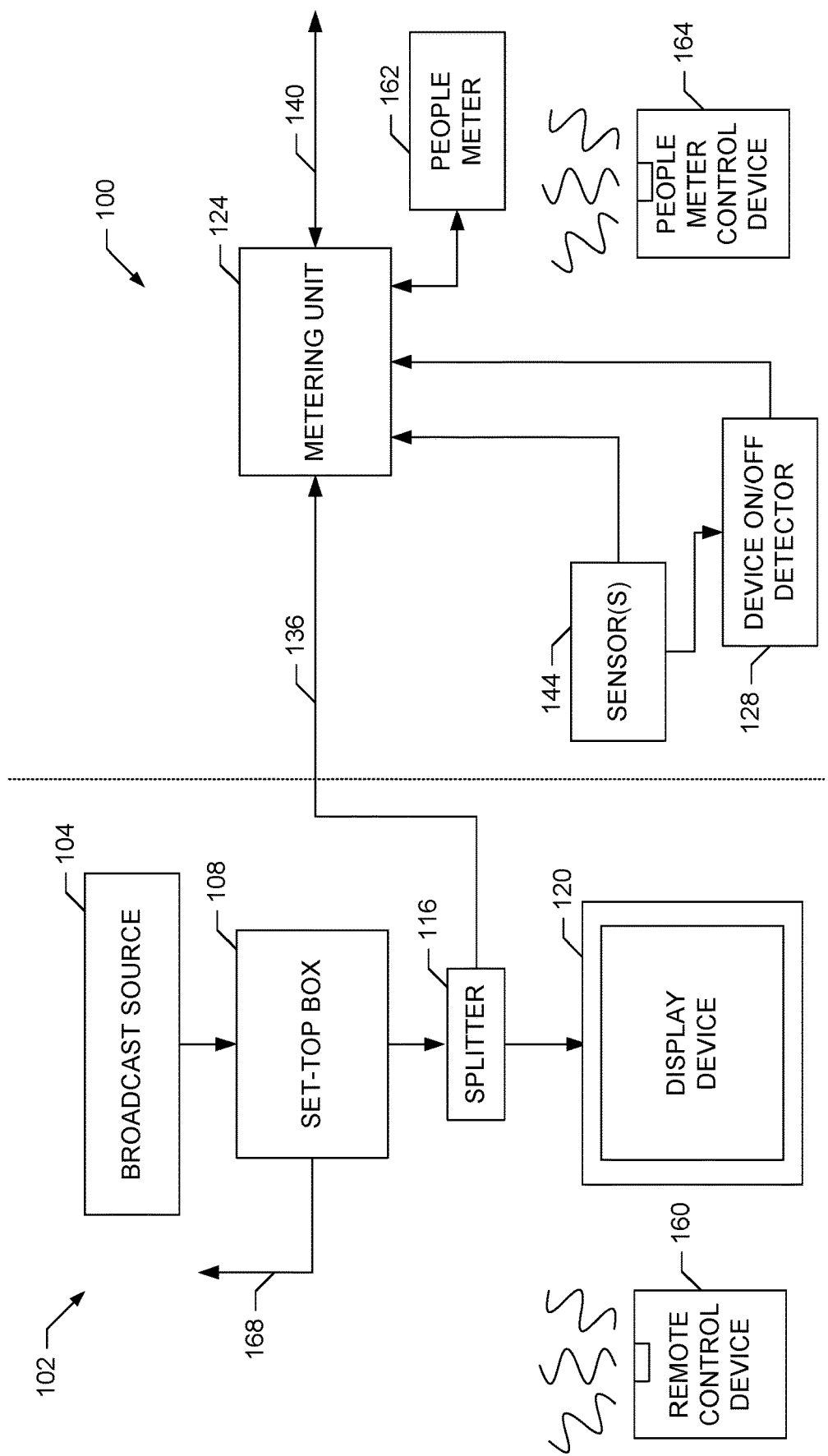
FIG. 1 is a block diagram of an example local metering system including an example display device ON/OFF detector and shown coupled to an example home entertainment system.

A block diagram of an example local metering system 100 capable of providing viewing and metering information for program content presented via an example home entertainment system 102 is illustrated in FIG. 1. The example home entertainment system 102 includes a broadcast source 104, a set-top box (STB) 108, a signal splitter 116 and a display device 120. The example local metering system 100 includes a metering unit 124 and a display device ON/OFF detector 128. The components of the home entertainment system 102 and the local metering system 100 may be connected in any well-known manner including that shown in FIG. 1. For example, in a statistically selected household having one or more home entertainment systems 102, the metering unit 124 may be implemented as a single home unit and one or more site units. In such a configuration, the single home unit may perform the functions of storing data and forwarding the stored data to a central facility for subsequent processing. Each site unit is coupled to a corresponding home entertainment system 102 and performs the functions of collecting viewing/metering data, processing such data (possibly in real-time) and sending the processed data to the single home unit for that home. The home unit receives and stores the data collected by the site units and subsequently forwards that collected data to the central facility.

The broadcast source 104 may be any broadcast media source, such as a cable television service provider, a satellite television service provider, a radio frequency (RF) television service provider, an internet streaming video/audio provider, etc. The broadcast source 104 may provide analog and/or digital television signals to the home entertainment system 102, for example, over a coaxial cable or via a wireless connection.

The STB 108 may be any set-top box, such as a cable television converter, a direct broadcast satellite (DBS) decoder, a video cassette recorder (VCR), etc. The set-top box 108 receives a plurality of broadcast channels from the broadcast source 104. Typically, the STB 108 selects one of the plurality of broadcast channels based on a user input, and outputs one or more signals received via the selected broadcast channel. In the case of an analog signal, the STB 108 tunes to a particular channel to obtain programming delivered on that channel. For a digital signal, the STB 108 may tune to a channel and decode certain packets of data to obtain programming delivered on a selected channel. For example, the STB 108 may tune to a major channel and then extract a program carried on a minor channel within the major channel via the decoding process mentioned above. For some home entertainment systems 102, for example, those in which the broadcast source 104 is a standard RF analog television service provider or a basic analog cable television service provider, the STB 108 may not be present as its function is performed by a tuner in the display device 120.

In the illustrated example, an output from the STB 108 is fed to a signal splitter 116, such as a single analog y-splitter (in the case of an RF coaxial connection between the STB 108 and the display device 120) or an audio/video splitter (in the case of a direct audio/video connection between the STB 108 and the display device 120). (For configurations in which the STB 108 is not present, the broadcast source 104 may be coupled directly to the signal splitter 116). In the example home entertainment system 102, the signal splitter produces two signals indicative of the output from the STB 108. Of course, a person of ordinary skill in the art will readily appreciate that any number of signals may be produced by the signal splitter 116.

In the illustrated example, one of the two signals from the signal splitter 116 is fed to the display device 120 and the other signal is delivered to the metering unit 124. The display device 120 may be any type of video display device, such as a television. For example, the display device 120 may be a television and/or other display device (e.g., a computer monitor, a CRT, an LCD, etc.) that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, etc.

In the example of FIG. 1, the second of the two signals from the signal splitter 116 (i.e., the signal carried by connection 136 in FIG. 1) is coupled to an input of the metering unit 124. The metering unit 124 is a data logging and processing unit that may be used to generate viewing records and other viewing information useful for determining viewing and other metering information. The metering unit 124 typically collects a set of viewing records and transmits the collected viewing records over a connection 140 to a central office or data processing facility (not shown) for further processing or analysis. The connection 140 may be a telephone line, a return cable television connection, an RF or satellite connection, an internet connection or the like.

The metering unit 124 may be configured to determine identifying information based on the signal corresponding to the program content being output by the STB 108. For example, the metering unit 124 may be configured to decode an embedded code in the signal received via connection 136 that corresponds to the channel or program currently being delivered by the STB 108 for display on the display device 120. The code may be embedded for purposes such as, for example, audience measurement, program delivery (e.g., PIDS in a digital television presentation, electronic program guide information, etc.) or delivery of other services (e.g., embedded hyperlinks to related programming, closed caption information, etc.). Alternatively or additionally, the metering unit 124 may be configured to generate a program signature (e.g., a proxy signal which is uniquely representative of the program, signal) based on the signal received via connection 136 that corresponds to the program currently being delivered by the STB 108 for display on the display device 120. The metering unit 124 may then add this program identifying information (e.g., the code(s) and/or signature(s)) to the viewing records corresponding to the currently displayed program.

In the example local metering system 100, the display device ON/OFF detector 128 is coupled to the metering unit 124. The display device ON/OFF detector 128 is configured to determine whether the display device 120 or other monitored information presenting device (e.g., a computer monitor, etc.) is operating in an ON (active) state or an OFF (inactive) state. Such ON/OFF detection information concerning the operating state of the information presenting device 120 may be used to more accurately process the viewing information and viewing records determined by the metering unit 124. For example, in the home entertainment system 102, it is possible that even though the display device 120 is turned OFF, the STB 108 may be inadvertently or intentionally left in an ON (active) state such that the STB 108 continues to receive and output program content provided by the broadcast source 104. Without the ON/OFF detection information provided by the display device ON/OFF detector 128, the metering unit 124 (or subsequent processing at, for example, a central facility) might credit the program content provided by the STB 108 as being consumed even though the display device 120 is turned OFF. Thus, the display device ON/OFF detector 128 may be used to augment the viewing information and/or viewing records determined by the metering unit 124 to more accurately determine whether program content output by the STB 108 is actually presented by the display device 120.

To facilitate the determination of program identifying information and the generation of viewing records for the program content received and output by the STB 108, as well as the determination of the operating state of the display device 120 or corresponding information presenting device, the metering unit 124 and the display device ON/OFF detector 128 may be provided with one or more sensors 144. For example, a sensor 144 may be implemented by a microphone placed in the proximity of the display device 120 to receive audio signals corresponding to the program being displayed. The metering unit 124 and/or display device ON/OFF detector 128 may then process the audio signals received from the microphone 144 to decode any embedded ancillary code(s) and/or generate one or more audio signatures corresponding to a program being displayed. The display device ON/OFF detector 128 may also process the audio signal to determine whether the display device 120 is turned ON and emitting audio signals consistent with operation in an active state.

Additionally or alternatively, a sensor 144 may be implemented by an on-screen display detector for capturing images displayed on the display device 120 and processing regions of interest in the displayed image. The regions of interest may correspond, for example, to a broadcast channel associated with the currently displayed program, a broadcast time associated with the currently displayed program, a viewing time associated with the currently displayed program, etc. Example on-screen display detectors are disclosed by Nelson, et al. in U.S. Provisional Patent Application Ser. No. 60/523,444 filed on Nov. 19, 2003, and Patent Cooperation Treaty Application Serial No. PCT/US04/12272 filed on Apr. 19, 2004, both of which are hereby incorporated by reference.

Additionally or alternatively, a sensor 144 could be implemented by a frequency detector to determine, for example, the channel to which the display device 120 is tuned.

Additionally or alternatively, a sensor 144 could be implemented by an electromagnetic (EM) field pickup, a current sensor and/or a temperature sensor configured to detect emissions from the display device 120 indicative of the display device 120 being turned ON. Persons having ordinary skill in the art will recognize that there are a variety of sensors 144 that may be coupled with the metering unit 124 and/or the display device ON/OFF detector to facilitate generation of viewing records and display device operating state data containing sufficient information to determine a set of desired ratings and/or metering results. Persons of ordinary skill in the art will also appreciate that any or all of the sensors 144 may be located separate from and/or disposed in the metering unit 124, the display device ON/OFF detector 128 and/or any combination thereof. Additionally or alternatively, any or all of the sensors 144 may be duplicated in the metering unit 124 and the display device ON/OFF detector 128 to, for example, facilitate flexible placement of the various components of the local metering system 100 to permit metering of a wide range of home entertainment systems 102.

The example home entertainment system 102 of FIG. 1 also includes a remote control device 160 to transmit control information that may be received by any or all of the STB 108, the display device 120, the metering unit 124 and/or the display device ON/OFF detector 128. Persons having ordinary skill in the art will recognize that the remote control device 160 may transmit this information using a variety of techniques, including, but not limited to, infrared (IR) transmission, ultrasonic transmission, radio frequency transmission, wired/cabled connection, and the like.

The example local metering system 100 of FIG. 1 also includes a people meter 162 to capture information about the audience. The example people meter 162 may be configured to receive information from a people meter control device 164 having a set of input keys, each assigned to represent a single viewer. The people meter 162 may prompt the audience members to indicate that they are present in the viewing audience by pressing the appropriate input key on the people meter control device 164. The people meter 162 may also receive information from the metering unit 124 to determine a time at which to prompt the audience members. Moreover, the metering unit 124 may receive information from the people meter 162 and/or the people meter control device 164 to modify an operation of the metering unit 124 (e.g., such as causing the metering unit 124 to generate one or more viewing records based on a change in the viewing audience). The display device ON/OFF detector 128 may also receive information from the people meter 162 and/or people meter control device 164 to facilitate determination of whether the display device 120 is currently turned ON (e.g., such as receiving responses to prompts displayed by the display device 120). As will be appreciated by persons having ordinary skill in the art, the people meter control device 164 may transmit and/or receive information using a variety of techniques, including, but not limited to, infrared (IR) transmission, radio frequency transmission, ultrasonic transmission, wired/cabled connection, and the like. As will also be appreciated by persons having ordinary skill in the art, the people meter control device 164 and people meter 162 may be implemented by a combination of the remote control device 160 and one or more of the STB 108 and/or the metering unit 124. In such an implementation, the STB 108 and/or the metering unit 124 may be configured to display prompting information and/or other appropriate people meter content directly on the display device 120. Correspondingly, the remote control device 160 may be configured to accept inputs from the viewing audience and transmit these user inputs to the appropriate device responsible for generating the people meter display on the display device 120.

Persons of ordinary skill in the art will appreciate that the metering unit 124 and the display device ON/OFF detector 128 may be implemented as separate devices or integrated into a single unit. Additionally or alternatively, any or all or the metering unit 124, the display device ON/OFF detector 128, or portions thereof may be integrated into the STB 108 and/or the display device 120. For example, the display device ON/OFF detector 128 could be integrated into the STB 108 such that STB 108 is able to determine whether program content being received and output is also being presented by the monitored display device 120 or corresponding information presenting device. Such display device operating state information, coupled with operating state information concerning the STB 108 itself, could be transmitted back to the broadcast provider responsible for the broadcast source 104 via a back-channel connection 168 to allow the broadcast provider to, for example, monitor consumption of program content output by the STB 108 and presented by the display device 120 in the absence of the metering unit 124.

Figure 2:
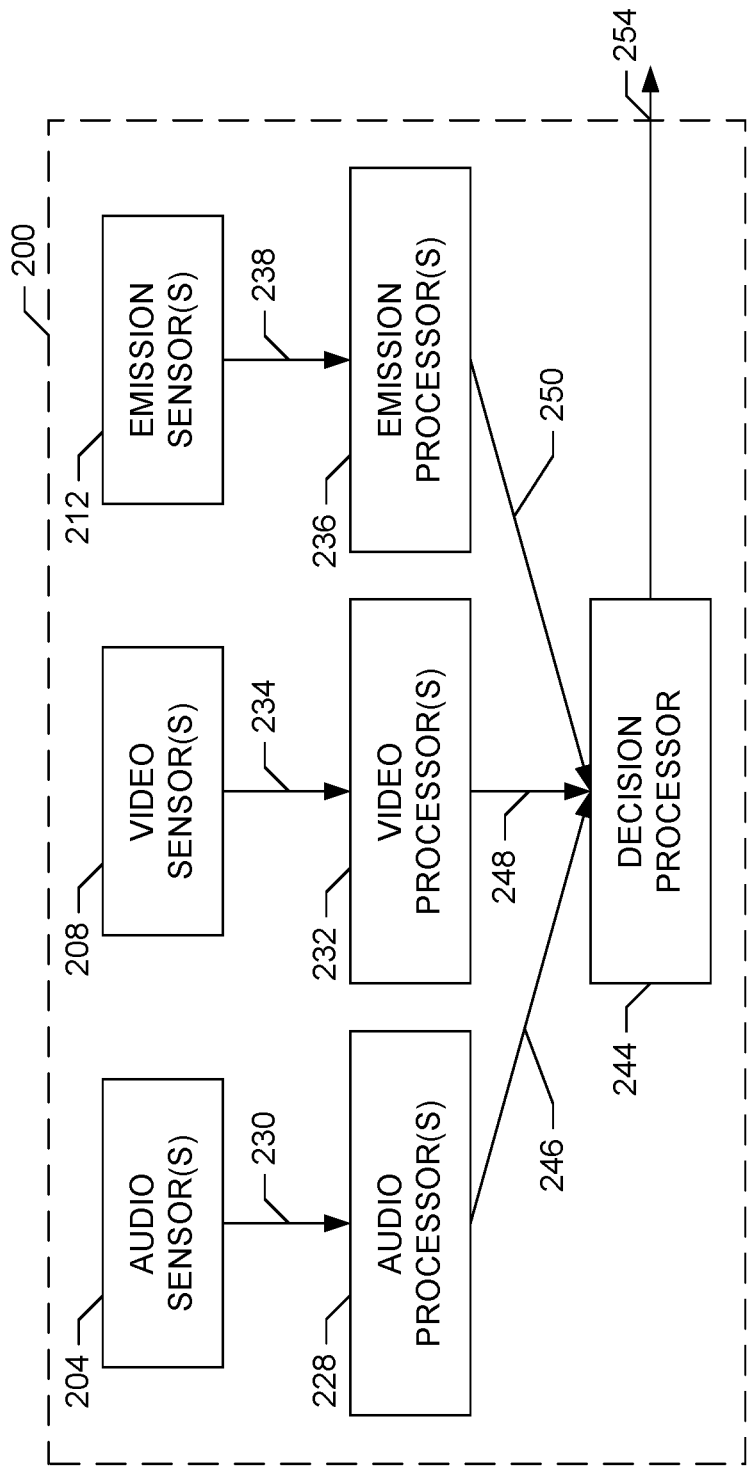
FIG. 2 is a block diagram of the example display device ON/OFF detector of FIG. 1.

A block diagram of an example display device ON/OFF detector 200 that may be used to implement the display device ON/OFF detector 128 of FIG. 1 is illustrated in FIG. 2. The example display device ON/OFF detector 200 is configured to process signals received from one or more sensors, such as the sensors 144 of FIG. 1. In the example of FIG. 2, the display device ON/OFF detector 200 includes an audio sensor 204, a video sensor 208 and an emission sensor 212. The audio sensor 204 may be one or more microphones positioned to detect audio signals emitted by the display device 120 or corresponding information presenting device. The video sensor 208 may be, for example, a camera, a single output analog or digital light sensor, etc., positioned to detect the display area of the display device 120 or corresponding information presenting device. The emission sensor 212 may include one or more sensors configured to detect emissions from the display device 120 or corresponding information presenting device, or emissions from other devices that may be indicative of the operating state of the display device 120 or corresponding information presenting device. For example, the emission sensor 212 may include an EM field pickup to detect EM emissions from the display device 120, a current detector to detect current draw from a power source coupled to the display device 120, a temperature sensor to detect heat radiated by the display device 120, a receiver to detect control signals from, for example, the remote control device 160 and/or people meter control device 164 indicative of an active display device 120, etc.

The display device ON/OFF detector 200 includes one or more audio processors 228 to process the audio signal 230 output by the audio sensor 224. The audio processors 228 are configured to determine characteristics of the input audio signal 230 and/or information included in the input audio signal 230 that may be used to ascertain whether the monitored information presenting is turned ON and operating in an active state. Examples of audio processors 228 are discussed in greater detail below in connection with FIG. 3.

The example display device ON/OFF detector 200 also includes one or more video processors 232 to process the video signal 234 output by the video sensor 208. Similar to the audio processors 228, the video processors 232 are configured to determine characteristics of the input video signal 234 and/or information included in the input video signal 234 that may be used to ascertain whether the information presenting device monitored by the display device ON/OFF detector 200 (e.g., the display device 120) is turned ON and operating in an active state. Examples of video processors 232 are discussed in greater detail below in connection with FIG. 4.

The example display device ON/OFF detector 200 also includes one or more emission processors 236 to process the emission signals 238 output by the emission sensor 212. Similar to the audio processors 228 and the video processors 232, the emission processors 236 are configured to determine characteristics of the input emission signals 238 and/or information included in the input emission signals 238 that may be used to ascertain whether the information presenting device monitored by the display device ON/OFF detector 200 (e.g., the display device 120) is turned ON and operating in an active state. Examples of emission processors 236 are discussed in greater detail below in connection with FIG. 5.

The example display device ON/OFF detector 200 of FIG. 2 includes a decision processor 244 to process the ON/OFF decision outputs 246, 248 and 250 generated by the audio processor(s) 228, the video processor(s) 232 and/or the emission processor(s) 236, if present. The decision processor 244 processes the available input information to determine whether the information presenting device monitored by the display device ON/OFF detector 200 (e.g., the display device 120) is turned ON and operating in an active state. The decision processor 244 outputs its ON/OFF decision via the device ON/OFF decision output 254. An example set of machine readable instructions which may be executed to implement the decision processor 244 is discussed in greater detail below in connection with FIG. 27.

Figure 3:
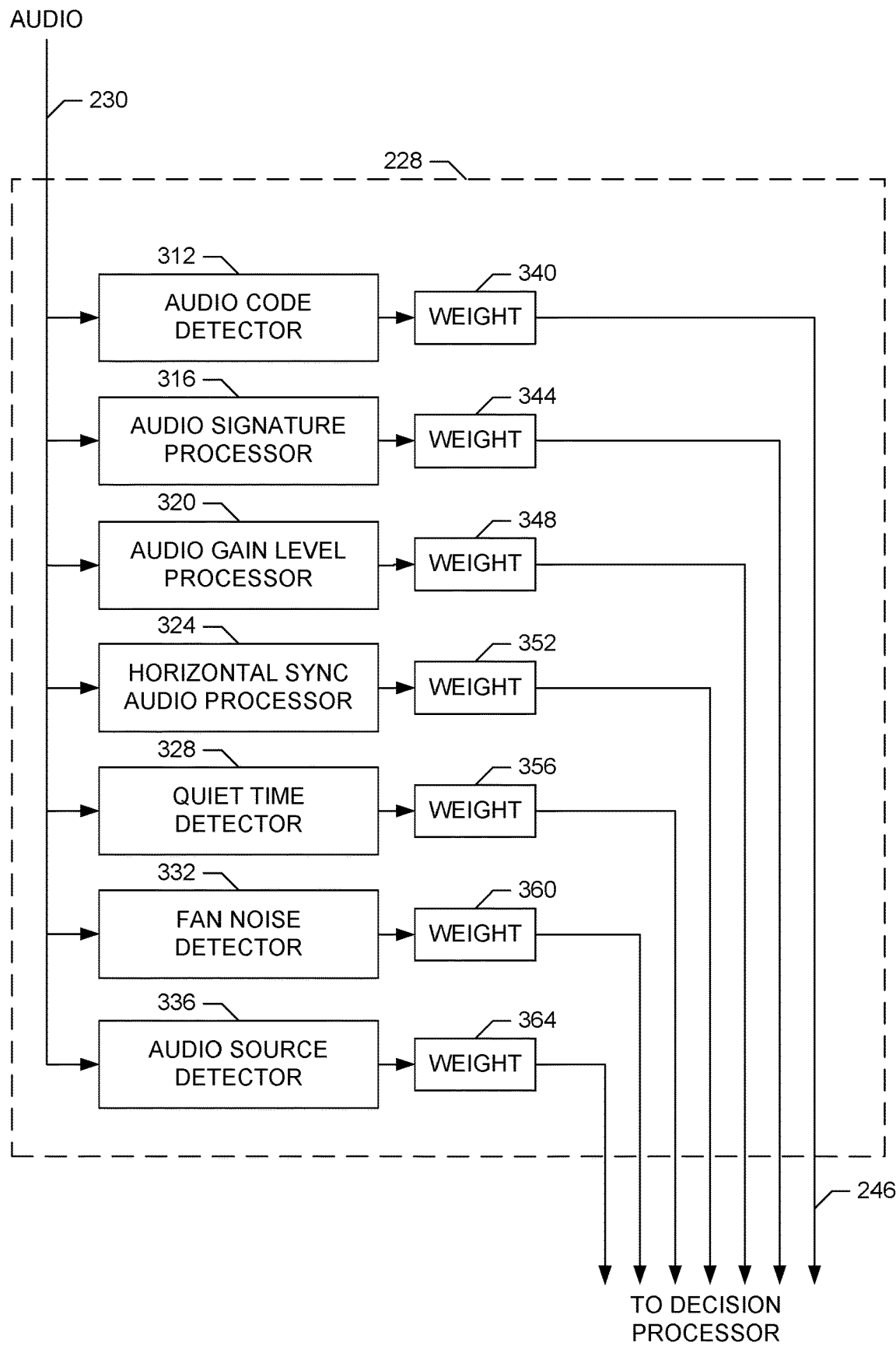
FIG. 3 is a block diagram of an example set of audio processors that may be used to implement the example display device ON/OFF detector of FIG. 2.

An example set of audio processors 228 is shown in FIG. 3. The audio processors 228 process the input audio signal(s) 230 provided, for example, by the audio sensor(s) 204 of FIG. 2. The input audio signal(s) 230 are intended to correspond to an audio signal being output by a monitored information presenting device, such as the display device 120 of FIG. 1. A particular audio processor in the set of audio processors 228 may be configured to sample and process the input audio signal 230 at a frequency that depends on the processing performed by that particular audio processor. Thus, the audio processors 228 may operate autonomously and read the input audio signal 230 and generate corresponding audio processor outputs 246 in an autonomous fashion.

The example set of audio engines 228 of FIG. 3 includes an audio code detector 312, an audio signature processor 316, an audio gain level processor 320, a horizontal sync audio processor 324, a quiet time detector 328, a fan noise processor 332 and an audio source detector 336. The example audio code detector 312 is configured to detect audio codes that may be embedded in the audio signal corresponding to the input audio signal 230. As is known, audio codes may be used to encode and embed identifying information (e.g., a broadcast/network channel number, a program identification code, a broadcast time stamp, a source identifier to identify a network and/or station providing and/or broadcasting the content, etc.) in, for example, non-audible portions of the audio signal accompanying a broadcast program. Methods and apparatus for implementing the audio code detector 312 are known in the art. For example, in U.S. Pat. No. 6,272,176, incorporated herein by reference in its entirety, Srinivasan discloses a broadcast encoding system and method for encoding and decoding information transmitted within an audio signal. This and/or any other appropriate technique may be used to implement the audio code detector 312. Additionally, example machine readable instructions 1300 that may be executed to implement the audio code detector 312 are discussed in the detailed description of FIG. 13 below.

The example audio signature processor 316 of FIG. 3 is configured to generate and process audio signatures corresponding to the input audio signal 230. As is known, characteristics of the audio portion of presented program content may be used to generate a substantially unique proxy or signature (e.g., a series of digital values, a waveform, etc.) for that content. The signature information for the content being presented may be compared to a set of reference signatures corresponding to a known set of content. When a substantial match is found, the currently presented program content can be identified with a relatively high probability. Methods and apparatus for implementing the audio signature processor 316 are known in the art. For example, in U.S. patent application Ser. No. 09/427,970, incorporated herein by reference in its entirety, Srinivasan, et al. disclose audio signature extraction and correlation techniques. As another example, in Patent Cooperation Treaty Application Serial No. PCT/US03/22562, incorporated herein by reference in its entirety, Lee, et al. disclose signature based program identification apparatus and methods for use with a digital broadcast system. These and/or any other appropriate technique may be used to implement the audio signature processor 316. Additionally, example machine readable instructions 1400 and 1500 that may be executed to implement the audio signature processor 316 are discussed in the detailed description of FIGS. 14-15 below.

The example audio gain level processor 320 of FIG. 3 is configured to determine the amount of amplifier gain applied to the input audio signal 230 to appropriately fill the dynamic range of an analog-to-digital converter used to sample the input audio signal 230 for processing by the various audio signal processors 228. Knowledge of the amount of gain applied to the input audio signal 230 may be used, for example, by a decision processor, such as the decision processor 244 of FIG. 2, to determine whether a monitored information presenting device is ON and emitting an audio signal. Example machine readable instructions 1600 that may be executed to implement the audio gain level processor 320 are discussed in the detailed description of FIG. 16 below.

The example horizontal sync audio processor 324 of FIG. 3 is configured to determine whether the input audio signal 230 includes audio emissions generated by a horizontal scan fly-back transformer used to scan an electron beam across a picture tube of a monitored information presenting device, such as the display device 120 of FIG. 1. For example, in a display device 120 operating in accordance with the NTSC standard, the laminations of the fly-back transformer emit a tonal audio signal at approximately 15.75 kHz. Knowledge of the whether the input audio signal 230 includes audio emission corresponding to the horizontal scan fly-back transformer may be used, for example, by a decision processor, such as the decision processor 244 of FIG. 2, to determine whether a monitored information presenting device is ON. Methods and apparatus which may be adapted to implement the horizontal sync audio processor 324 are known in the art. For example, Patent Cooperation Treaty Application Serial No. PCT/US02/12333, incorporated herein by reference in its entirety, discloses a television proximity sensor based on monitoring the audio signal emitted by a horizontal scan fly-back transformer. This and/or any other appropriate technique may be used to implement the horizontal sync audio processor 324. Additionally, example machine readable instructions 1700 that may be executed to implement the horizontal sync audio processor 324 are discussed in the detailed description of FIG. 17 below.

The example quiet time detector 328 of FIG. 3 is configured to determine whether the input audio signal 230 includes quiet time characteristics typically associated with, for example, broadcast channel change events, etc. Knowledge of the whether the input audio signal 230 includes quiet time characteristics may be used, for example, by a decision processor, such as the decision processor 244 of FIG. 2, to determine whether a monitored information presenting device is ON based on the presence of audio indicative of the information presenting device being controlled by a user. Methods and apparatus which may be adapted to implement the quiet time detector 328 are known in the art. For example, Patent Cooperation Treaty Application Serial No. PCT/US03/27336, incorporated herein by reference in its entirety, discloses audio based methods and apparatus for detecting channel change events which employ detection of quiet-time intervals. This and/or any other appropriate technique may be used to implement the quiet time detector 328. Additionally, example machine readable instructions 1800 that may be executed to implement the quiet time detector 328 are discussed in the detailed description of FIG. 18 below.

The example fan noise detector 332 of FIG. 3 is configured to determine whether the input audio signal 230 includes a component indicative of audio noise generated by a fan assembly operating in a monitored information presenting device. Knowledge of the whether the input audio signal 230 includes fan noise may be used, for example, by a decision processor, such as the decision processor 244 of FIG. 2, to determine whether a monitored information presenting device is ON based on the activation of an associated fan assembly. Example machine readable instructions 1900 that may be executed to implement the fan noise detector 332 are discussed in the detailed description of FIG. 19 below.

The example audio source detector 336 of FIG. 3 is configured to determine the location of the source of the input audio signal 230. Knowledge of the location of the source of the input audio signal 230 may be used, for example, by a decision processor, such as the decision processor 244 of FIG. 2, to determine whether a monitored information presenting device is ON based on whether the determined source location coincides with the monitored information presenting device. Methods and apparatus which may be adapted to implement the audio source detector 336 are known in the art. For example, in "A Tentative Typology of Audio Source Separation Tasks," ICA2003, April 2003, incorporated herein by reference in its entirety, Vincent, et al. discuss techniques for audio source separation. Additionally, in "Using IIDs to Estimate Sound Source Direction," in *From Animals to Animats* 7, edited by Hallam, et al., MIT Press, 2002, incorporated herein by reference in its entirety, Smith discusses techniques for using inter-aural intensity differences to determine audio source direction information. These and/or any other appropriate technique may be used to implement the audio source detector 336. Additionally, example machine readable instructions 2000 that may be executed to implement the audio source detector 336 are discussed in the detailed description of FIG. 20 below.

As shown in the example of FIG. 3, the results of each audio processor 312-336 may be scaled/prioritized by a set of respective weights 340-364. For example, the weights 340-364 may explicitly scale the processor results based on the amount of information, amount of confidence, etc. that a respective result may contribute to the processing performed by a decision processor, such as the decision processor 224 of FIG. 2. Additionally or alternatively, the weights 340-364 may be implicit and based, for example, on a stage in which a particular audio processor result is used in a decision process performed by the decision processor, the priority given a particular audio processor result by the decision processor, etc. In any case, the scaling may be dynamic or static. Also, the weights 340-364 may be eliminated explicitly or implicitly be setting the values of the weights 340-364 all equal to one.

Figure 4:
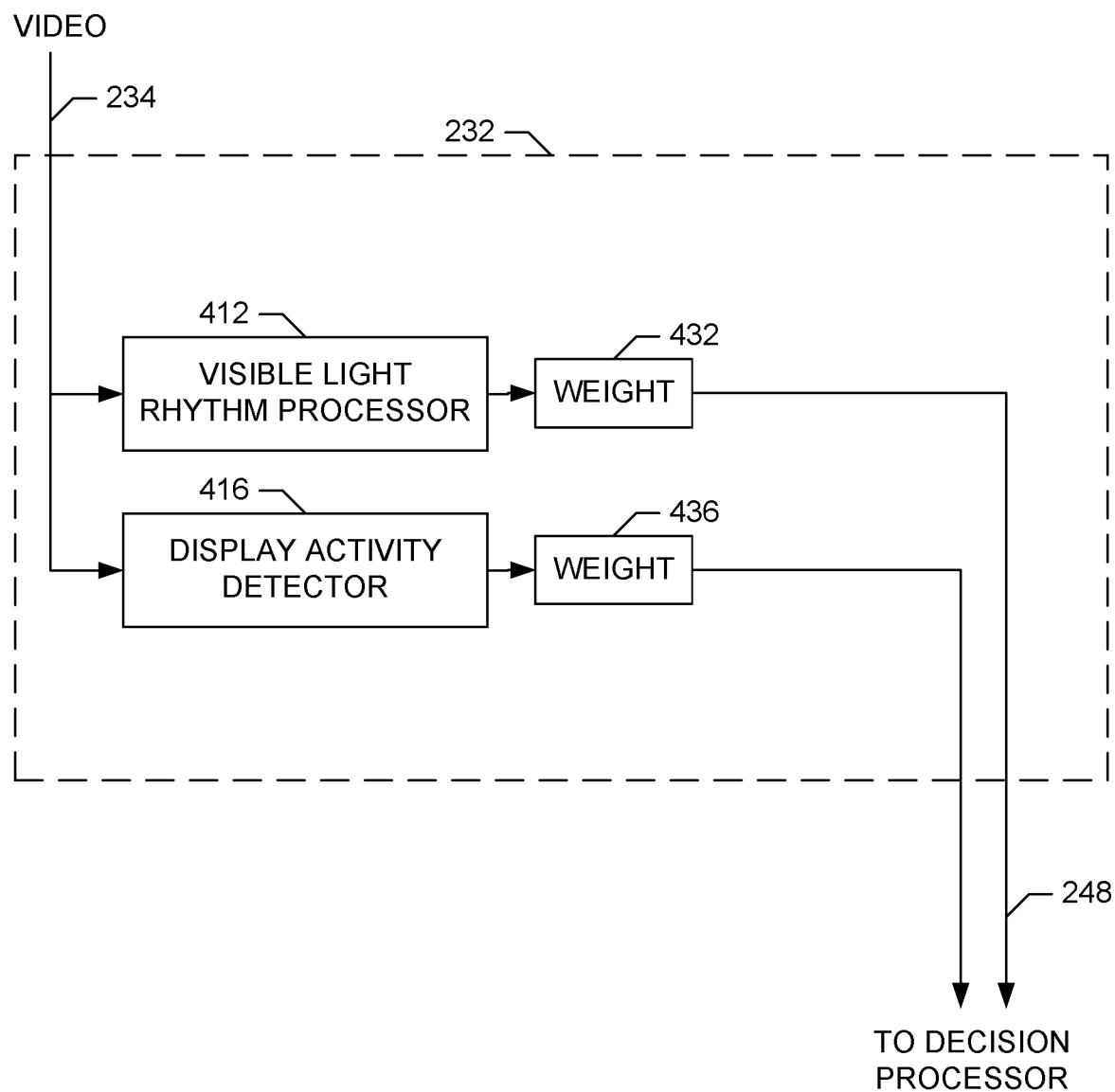
FIG. 4 is a block diagram of an example set of video processors that may be used to implement the example display device ON/OFF detector of FIG. 2.

An example set of video processors 232 is shown in FIG. 4. The video processors 232 process the input video signal 234 provided, for example, by the video sensor 208 of FIG. 2. The input video signal 234 is intended to be representative of a display corresponding to a monitored presentation device, such as the display device 120 of FIG. 1. A particular video processor in the set of video processors 232 may be configured to sample and process the input video signal 234 at a frequency that depends on the processing performed by that particular video processor. Thus, the video processors 232 may operate autonomously and sample the input video signal 234 and generate corresponding video processor outputs 248 in an autonomous fashion.

The example set of video engines 232 of FIG. 4 includes a visible light rhythm processor 412 and a display activity detector 416. The example visible light rhythm processor 412 of FIG. 4 is configured to determine whether light patterns over time associated with the input video signal 234 corresponds to patterns indicative of an active display of a monitored information presenting device. Knowledge of whether the input video signal 234 includes such light patterns may be used, for example, by a decision processor, such as the decision processor 244 of FIG. 2, to determine whether a monitored information presenting device is ON based on whether the light patterns are indicative of an active display device. Methods and apparatus which may be adapted to implement the visible light rhythm processor 412 are known in the art. For example, Patent Cooperation Treaty Application Serial No. PCT/US03/30370, incorporated herein by reference in its entirety, discloses methods and apparatus to detect an operating state of a display based on visible light. This and/or any other appropriate technique may be used to implement the visible light rhythm processor 412. Additionally, example machine readable instructions 2100 that may be executed to implement the visible light rhythm processor 412 are discussed in the detailed description of FIG. 21 below.

The example display activity detector 416 of FIG. 4 is configured to determine whether a particular region of a monitored scene corresponding to the input video signal 234 varies in accordance with an active display of a monitored information presenting device. Knowledge of whether the input video signal 234 includes such varied scene activity may be used, for example, by a decision processor, such as the decision processor 244 of FIG. 2, to determine whether a monitored information presenting device is ON based on whether the regions of the scene associated with the display of the information presenting device indicate that the display is active. Example machine readable instructions 2200 that may be executed to implement the display activity detector 416 are discussed in the detailed description of FIG. 22 below.

As shown in the example of FIG. 4, the results of each video processor 412-416 may be scaled/prioritized by a set of respective weights 432-436. For example, the weights 432-436 may explicitly scale the video processor results based on the amount of information, amount of confidence, etc. that a respective result may contribute to the processing performed by a decision processor, such as the decision processor 224 of FIG. 2. Additionally or alternatively, the weights 432-436 may be implicit and based, for example, on a stage in which a particular video processor result is used in a decision process performed by the decision processor, the priority given a particular video processor result by the decision processor, etc. In any case, the scaling may be dynamic or static. Also, the weights 432-436 may be eliminated explicitly or implicitly be setting the values of the weights 432-436 all equal to one.

Figure 5:
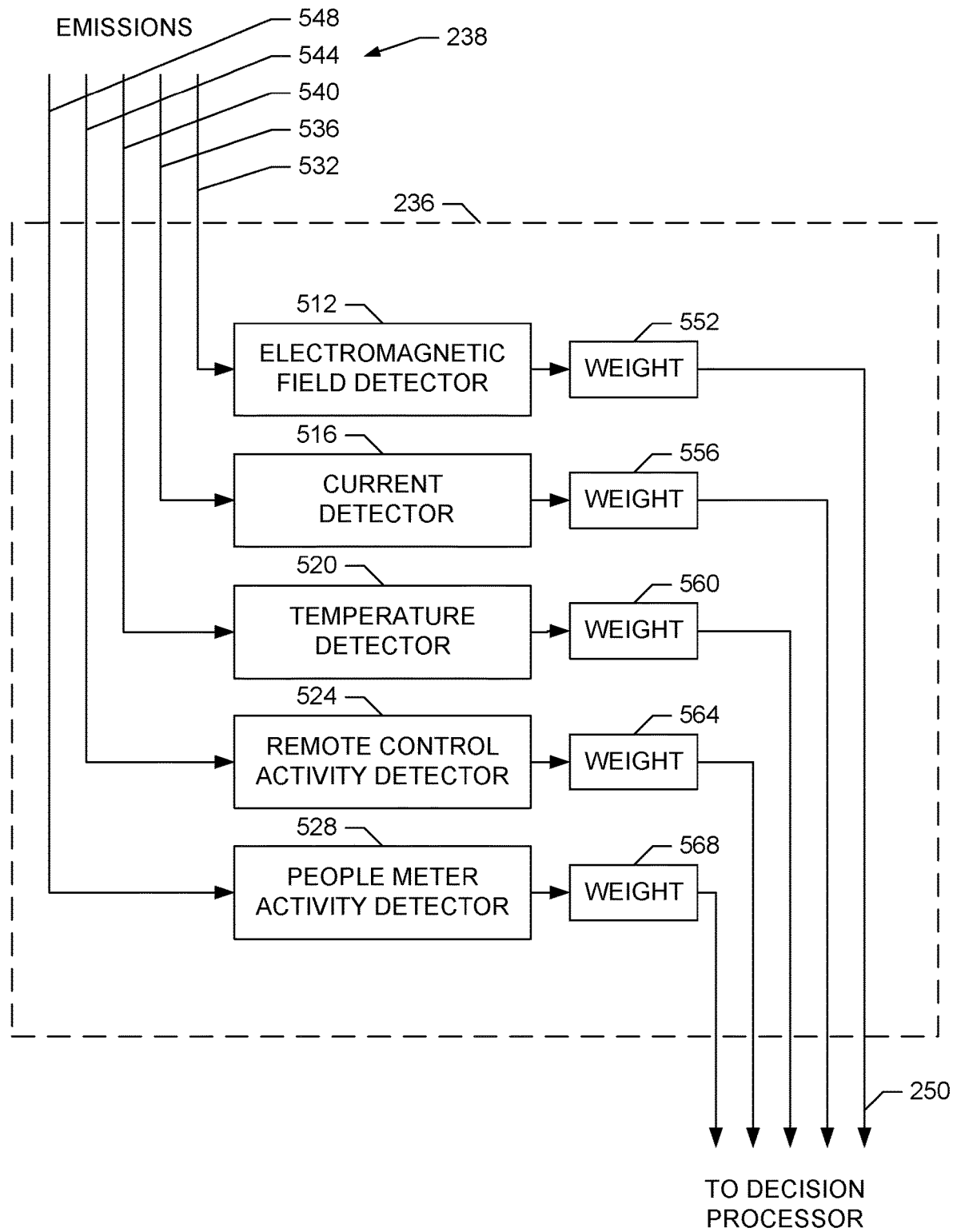
FIG. 5 is a block diagram of an example set of emissions processor that may be used to implement the example display device ON/OFF detector FIG. 2.

An example set of emissions processors 236 is shown in FIG. 5. The emissions processors 236 of FIG. 5 process the input emission signals 238 provided, for example, by the emission sensors 212 of FIG. 2. The input emissions signals 238 are intended to correspond to one or more emissions from a monitored presentation device, such as the display device 120 of FIG. 1. A particular emission processor in the set of emission processors 236 may be configured to sample and process the appropriate input emission signal 238 at a frequency that depends on the processing performed by that particular emission processor. Thus, the emission processors 236 may operate autonomously and sample the appropriate input emission signal 238 and generate corresponding emission processor outputs 250 in an autonomous fashion.

The example set of emissions processors 236 of FIG. 5 includes an electromagnetic (EM) field detector 512, a current detector 516, a temperature detector 520, a remote control activity detector 524 and a people meter activity detector 528. The example EM field detector 512 of FIG. 5 is configured to process an EM field emission input 532 corresponding to an EM field measured by an appropriately configured emission sensor 212. Knowledge of whether the EM field emission input 532 corresponds to EM field emissions from a monitored information presenting device may be used, for example, by a decision processor, such as the decision processor 244 of FIG. 2, to determine whether the monitored information presenting device is ON. Any known technique may be used to implement the EM field detector 512. Additionally, example machine readable instructions 2300 that may be executed to implement the EM field detector 512 are discussed in the detailed description of FIG. 23 below.

The example current detector 516 of FIG. 5 is configured to process a current input 536 corresponding to a current measured by an appropriately configured emission sensor 212. Knowledge of whether the current input 536 corresponds to an amount of current that would be drawn from a power source coupled to an actively-operating monitored information presenting device may be used, for example, by a decision processor, such as the decision processor 244 of FIG. 2, to determine whether the monitored information presenting device is ON. Any known technique may be used to implement the current detector 516. Additionally, example machine readable instructions 2400 that may be executed to implement the current detector 516 are discussed in the detailed description of FIG. 24 below.

The example temperature detector 520 of FIG. 5 is configured to process one or more temperature inputs 540 corresponding to, for example, sensors 212 configured to measure the temperature of a monitored information presenting device and the ambient air temperature of a room in which the information presenting device is located. Knowledge of whether the temperature of the monitored information presenting device is substantially higher than the ambient air temperature may be used, for example, by a decision processor, such as the decision processor 244 of FIG. 2, to determine whether the monitored information presenting device is ON. Example machine readable instructions 2500 that may be executed to implement the temperature detector 520 are discussed in the detailed description of FIG. 25 below.

The example remote control activity detector 524 of FIG. 5 is configured to process a remote control signal input 544 corresponding to a received signal from an appropriately configured emission sensor 212. Knowledge of whether the remote control signal input 544 corresponds to a valid remote control command may be used, for example, by a decision processor, such as the decision processor 244 of FIG. 2, to determine whether a monitored information presenting device is ON. Example machine readable instructions 2600 that may be executed to implement the remote control activity detector 524 are discussed in the detailed description of FIG. 26 below.

The example people meter activity detector 528 of FIG. 5 is configured to process a people meter signal input 548 corresponding to a received signal from an appropriately configured emission sensor 212. Knowledge of whether the remote control signal input 544 corresponds to a valid people meter response and/or command may be used, for example, by a decision processor, such as the decision processor 244 of FIG. 2, to determine whether a monitored information presenting device is ON. Example machine readable instructions 2600 that may be executed to implement the people meter activity detector 528 are discussed in the detailed description of FIG. 26 below.

As shown in the example of FIG. 5, the results of each emission processor 512-528 may be scaled/prioritized by a set of respective weights 552-568. For example, the weights 552-568 may explicitly scale the emission processor results based on the amount of information, amount of confidence, etc. that a respective result may contribute to the processing performed by a decision processor, such as the decision processor 224 of FIG. 2. Additionally or alternatively, the weights 552-568 may be implicit and based, for example, on a stage in which a particular emission processor result is used in a decision process performed by the decision processor, the priority given a particular emission processor result by the decision processor, etc. In any case, the scaling may be dynamic or static. Also, the weights 552-568 may be eliminated explicitly or implicitly be setting the values of the weights 552-568 all equal to one.

Figure 6:
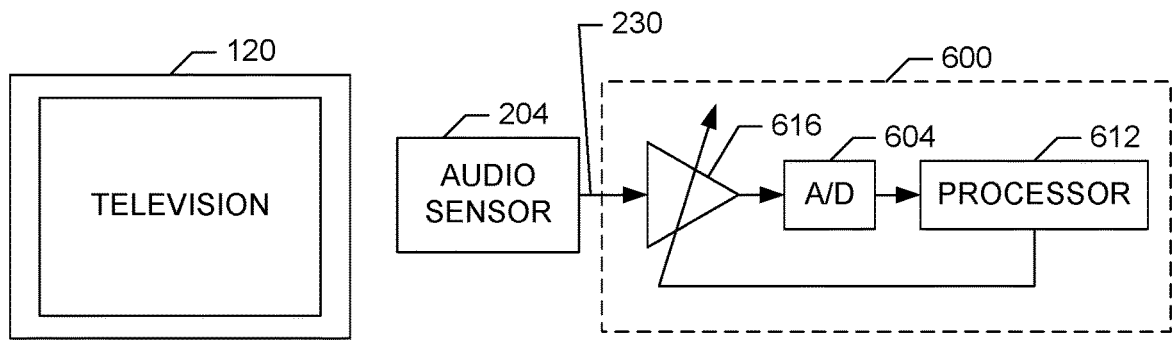
FIG. 6 is a block diagram of a first example audio processor system that may be used to implement one or more of the example audio processors of FIG. 3.

A first example audio processor system 600 that may be used to implement any or all of the audio code detector 312, the audio signature processor 316, the audio gain level processor 320, the horizontal sync audio processor 324, the quiet time detector 328 and/or the fan noise processor 332 of FIG. 3 is shown in FIG. 6. The example audio processor system 600 is configured to process audio signals emanating from the monitored display device 120 (or, more generally, a corresponding information presenting device) and detected by the audio sensor 204. The audio processor system 600 includes an analog-to-digital (A/D) converter 604 to sample the audio signal 230 output by the audio sensor 204 and convert the audio signal 230 to a digital format for processing by the processor 612. The audio processor system 600 also includes a variable gain amplifier (VGA) 616 which may amplify or attenuate, as needed, the audio signal 230 so that the audio signal 230 appropriately fills the dynamic range of the A/D converter 604 to yield a desired bit resolution at the output of the A/D converter 604.

The processor 612 may be configured to control the gain/attenuation provided by the VGA 616 based on any known automatic gain control (AGC) algorithm. For example, an AGC algorithm implemented by the processor 612 may control the VGA 616 to yield an output of the A/D converter 604 having an amplitude, variance, standard deviation, energy, etc. within a predetermined range. The predetermined range is typically derived from the characteristics of the particular A/D converter 604 to result in a gain/attenuation of the VGA 616 that appropriately fills the dynamic range of the A/D converter 604.

In addition to implementing the AGC algorithm, the processor 612 may also be configured to execute machine readable instructions to implement one or more of the audio code detector 312, the audio signature processor 316, the audio gain level processor 320, the horizontal sync audio processor 324, the quiet time detector 328 and/or the fan noise processor 332. Such machine readable instructions are discussed in greater detail below in connection with FIGS. 13-19.

Figure 7:
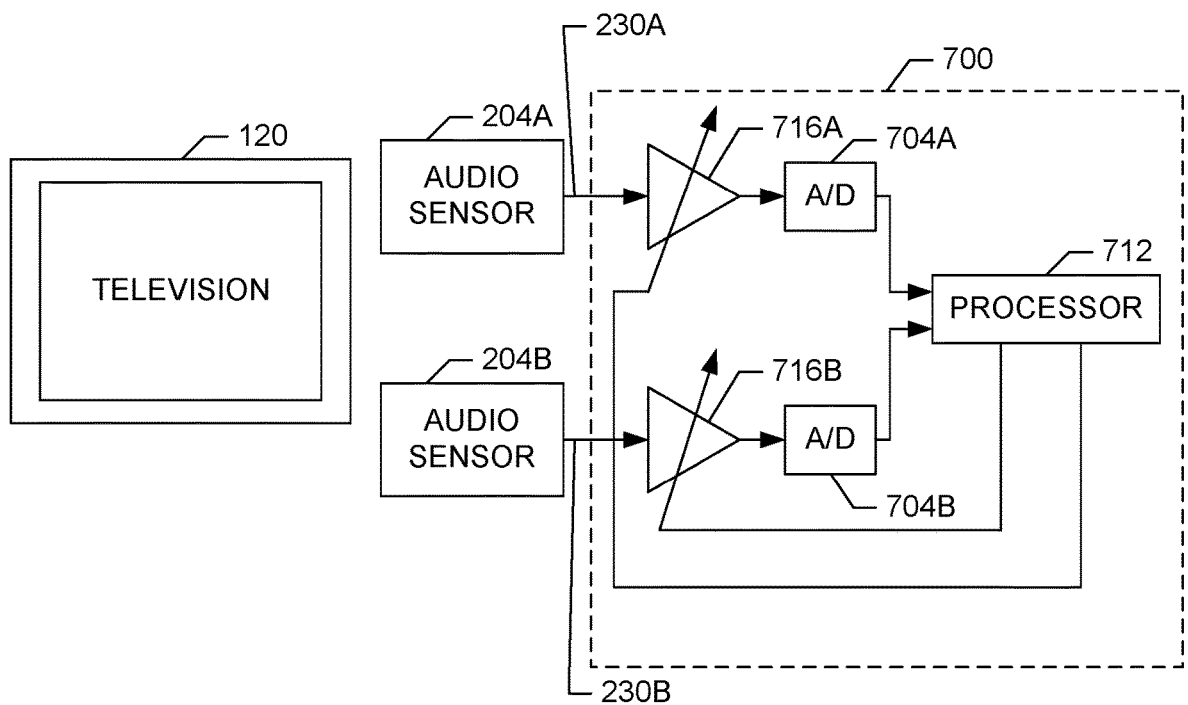
FIG. 7 is a block diagram of a second example audio processor system that may be used to implement one or more of the example audio processors of FIG. 3.

A second example audio processor system 700 that may be used to implement any or all of the audio code detector 312, the audio signature processor 316, the audio gain level processor 320, the horizontal sync audio processor 324, the quiet time detector 328, the fan noise processor 332 and/or the audio source detector 336 of FIG. 3 is shown in FIG. 7. The example audio processor system 700 is configured to process audio signals emanating from the monitored display device 120 (or, more generally, a corresponding information presenting device) and detected by two or more audio sensors 204A-B. The audio processor system 700 includes a first A/D converter 704A to sample the audio signal 230A output by the audio sensor 204A and convert the audio signal 230A to a digital format for processing by the processor 712. The audio processor system 700 also includes a first VGA 716A which may amplify or attenuate, as needed, the audio signal 230A so that the audio signal 230A appropriately fills the dynamic range of the A/D converter 604A to yield a desired bit resolution at the output of the A/D converter 604A.

The audio processor system 700 also includes a second A/D converter 704B to sample the audio signal 230B output by the audio sensor 204B and convert the audio signal 230B to a digital format for processing by the processor 712. Additionally, the audio processor system 700 includes a second VGA 716B which may amplify or attenuate, as needed, the audio signal 230B so that the audio signal 230B appropriately fills the dynamic range of the A/D converter 704B to yield a desired bit resolution at the output of the A/D converter 704B.

The processor 712 may be configured to control the gain/attenuation provided by the VGAs 716A-B based on any known AGC algorithm as discussed above in connection with FIG. 6. In addition to implementing the AGC algorithm, the processor 712 may also be configured to execute machine readable instructions to implement one or more of the audio code detector 312, the audio signature processor 316, the audio gain level processor 320, the horizontal sync audio processor 324, the quiet time detector 328, the fan noise processor 332 and/or the audio source detector 336. Such machine readable instructions are discussed in greater detail below in connection with FIGS. 13-20.

Figure 8:
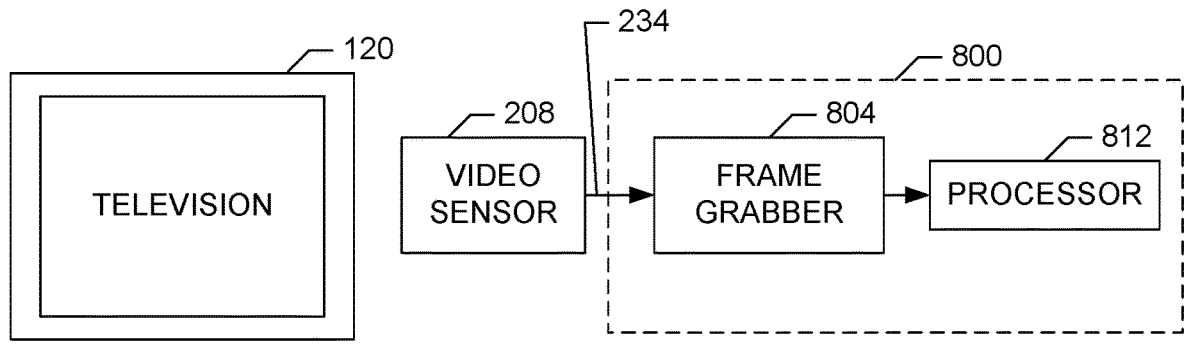
FIG. 8 is a block diagram of an example video processor system that may be used to implement one or more of the example video processors of FIG. 4.

An example video processor system 800 that may be used to implement any or all of the visible light rhythm processor 412 and/or the display activity detector 416 of FIG. 4 is shown in FIG. 8. The example video processor system 800 is configured to process video signals corresponding to the display of the monitored display device 120 (or, more generally, a corresponding information presenting device) as detected by the video sensor 208. The video processor system 800 includes a frame grabber 804 to capture video frames corresponding to video signal 234 output by the video sensor 208 for processing by the processor 812. Any known technique for capturing video frames and storing such video frames in a digital format may be used to implement the frame grabber 804.

The processor 812 may be configured to execute machine readable instructions to implement one or more of the visible light rhythm processor 412 and/or the display activity detector 416. Such machine readable instructions are discussed in greater detail below in connection with FIGS. 21-22.

Figure 9A:
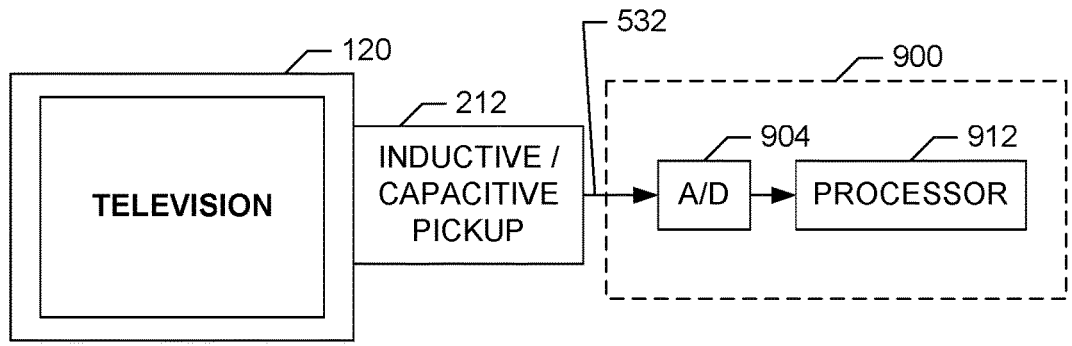
FIGS. 9A-B are block diagrams of two implementations of a first example emission processor system that may be used to implement the example electromagnetic field detector of FIG. 5.
Figure 9B:
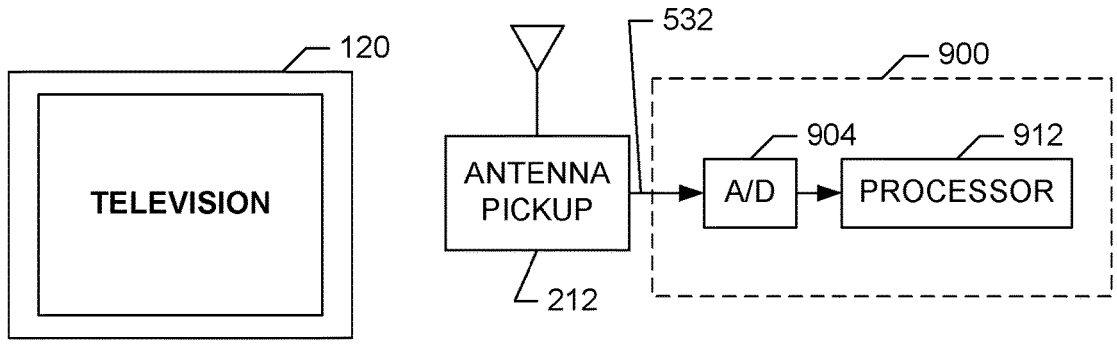

An example EM field processor system 900 that may be used to implement the EM field detector 512 of FIG. 5 is shown in FIGS. 9A-B. The example EM field processor system 900 is configured to process EM field emissions corresponding to the monitored display device 120 (or, more generally, a corresponding information presenting device) as detected by an emission sensor 212 implemented alternatively as an inductive or capacitive pickup 212 in FIG. 9A or as an antenna pickup 212 in FIG. 9B. In the examples of FIGS. 9A-9B, the emission sensor 212 provides the EM field signal 532 shown in FIG. 5 for processing by the EM field processor system 900. Inductive, capacitive and antenna pickups for detecting EM fields are known and, as such, are not discussed further herein.

The EM field processor system 900 includes an A/D converter 904 to sample the EM field signal 532 output by the emission sensor 212 and convert the EM field signal 532 to a digital format for processing by the processor 912. The processor 912 may be configured to execute machine readable instructions to implement the EM field detector 512. Such machine readable instructions are discussed in greater detail below in connection with FIG. 23.

Figure 10:
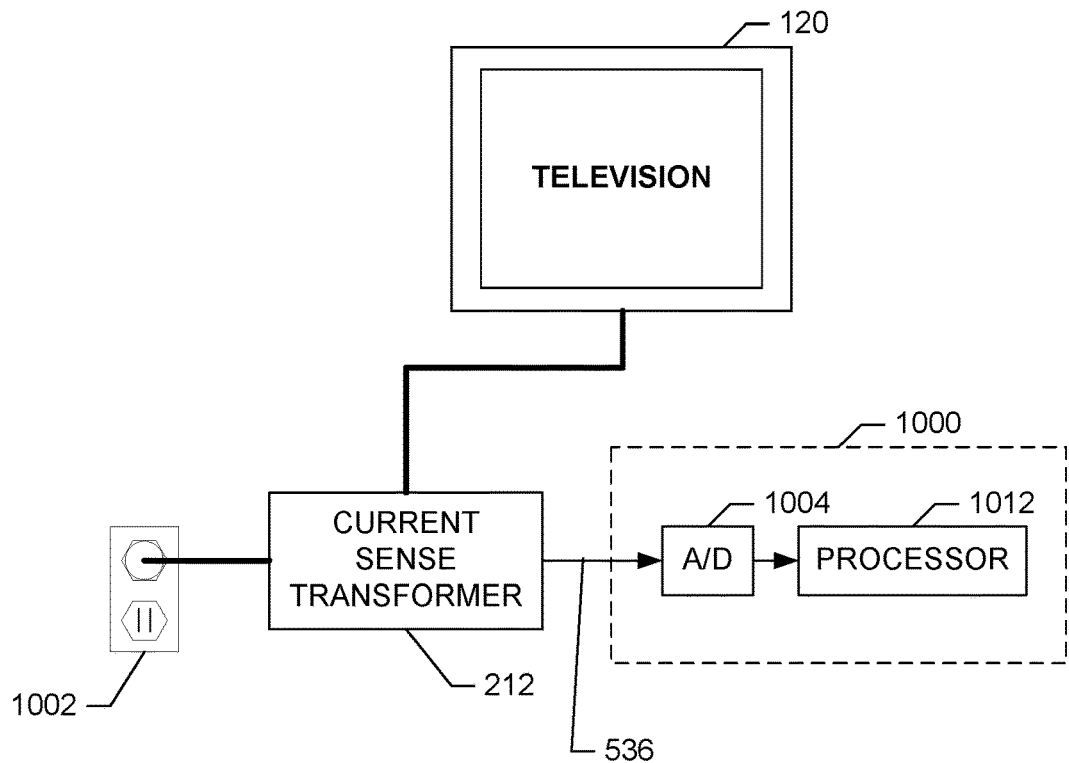
FIG. 10 is a block diagram of a second example emission processor system that may be used to implement the current detector of FIG. 5.

An example current measurement processor system 1000 that may be used to implement the current detector 516 of FIG. 5 is shown in FIG. 10. The example current measurement processor system 1000 is configured to measure the amount of current drawn by the monitored display device 120 (or, more generally, a corresponding information presenting device) from a power source 1002. The current draw is detected by an emission sensor 212 implemented, for example, as a current sense transformer 212 coupled between the monitored display device 120 and the power source 1002 as shown. In the example of FIG. 10, the emission sensor 212 provides the current measurement signal 536 shown in FIG. 5 for processing by the current measurement processor system 1000. Current sense transformers for measuring current draw are known and, as such, are not discussed further herein.

The current measurement processor system 1000 includes an A/D converter 1004 to sample the current measurement signal 536 output by the emission sensor 212 and convert the current measurement signal 536 to a digital format for processing by the processor 1012. The processor 1012 may be configured to execute machine readable instructions to implement the current detector 516. Such machine readable instructions are discussed in greater detail below in connection with FIG. 24.

Figure 11:
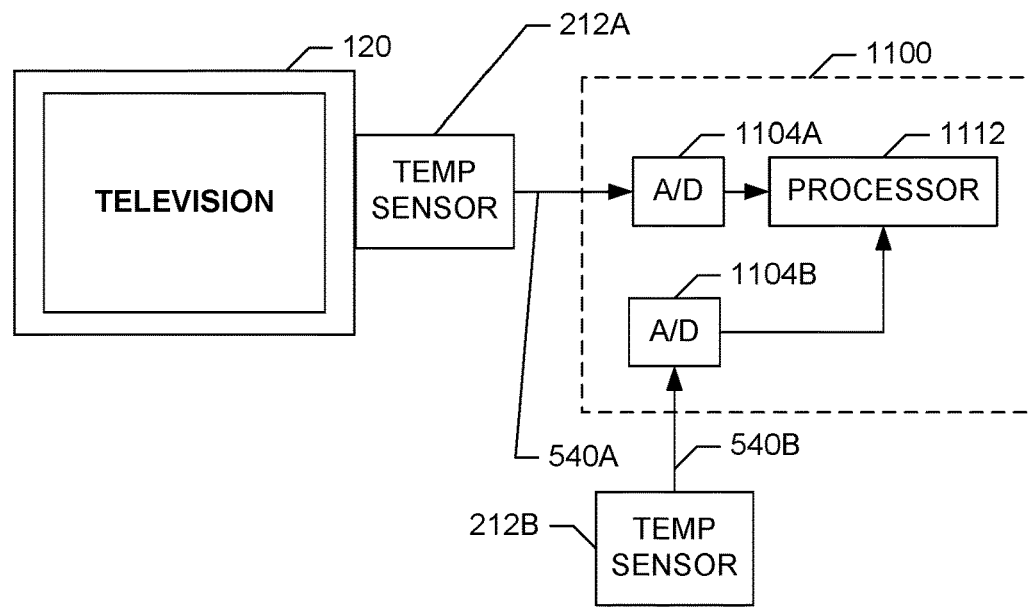
FIG. 11 is a block diagram of a third example emission processor system that may be used to implement the temperature detector of FIG. 5.

An example temperature processor system 1100 that may be used to implement the temperature detector 520 of FIG. 5 is shown in FIG. 11. The example temperature processor system 1100 is configured to measure heat emanating from the monitored display device 120 (or, more generally, a corresponding information presenting device). The heat emanating from the monitored display device 120 is detected by an emission sensor 212A implemented, for example, as a temperature sensor 212A coupled or positioned proximate to the monitored display device 120 as shown. In the example of FIG. 11, the emission sensor 212A provides a first temperature signal 540A, similar to the temperature signal 540 shown in FIG. 5, for processing by the temperature processor system 1100.

The temperature processor system 1100 may also include a second emission sensor 212B implemented, for example, as a temperature sensor 212B. The second emission sensor 212B may positioned to measure, for example, the ambient temperature of the room in which the monitored display device 120 is located. In the example of FIG. 11, the emission sensor 212B provides a second temperature signal 540B, similar to the temperature signal 540 shown in FIG. 5, for processing by the temperature processor system 1100. The temperature sensors 212A-B may be implemented by, for example, thermistors, analog silicon temperature sensors and/or digital silicon temperature sensors, all of which are known and, as such, are not discussed further herein.

The temperature processor system 1100 includes a first A/D converter 1104A to sample the temperature signal 540A output by the emission sensor 212A and convert the temperature signal 540A to a digital format for processing by the processor 1112. The temperature processor system 1100 also includes a second A/D converter 1104B to sample the temperature signal 540B output by the emission sensor 212B and convert the audio signal 540B to a digital format for processing by the processor 1112. The processor 1112 may be configured to execute machine readable instructions to implement the temperature detector 520. Such machine readable instructions are discussed in greater detail below in connection with FIG. 25.

Figure 12A:
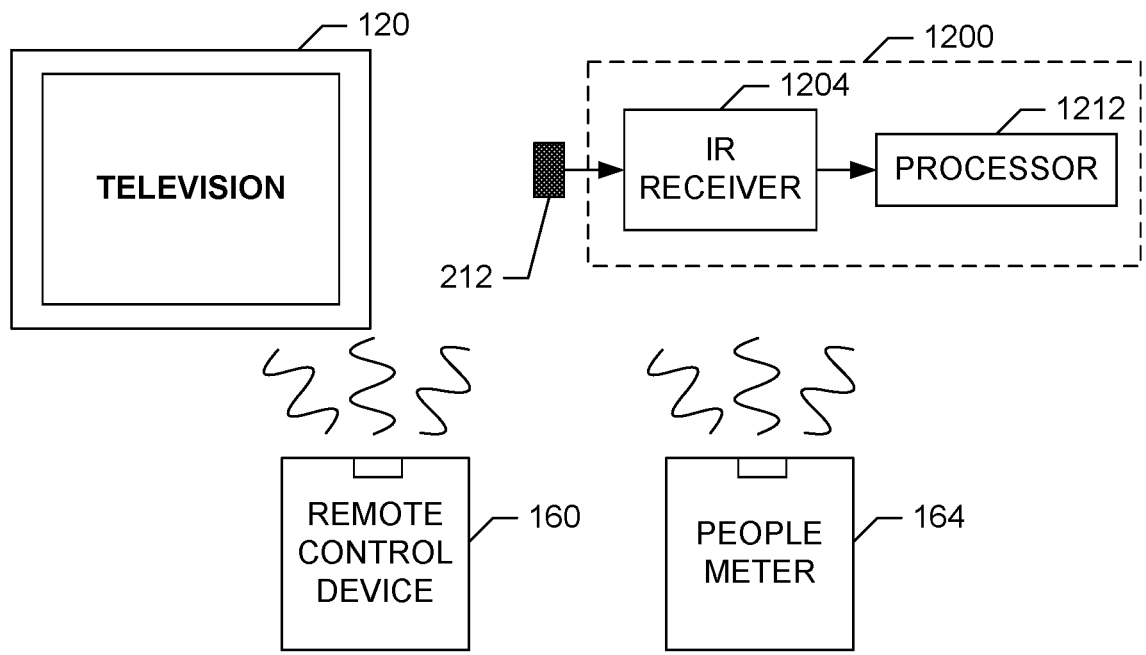
FIGS. 12A-C are block diagrams of fourth, fifth and sixth example emission processor systems that may be used to implement the remote control activity detector and/or the people meter activity detector of FIG. 5.
Figure 12B:
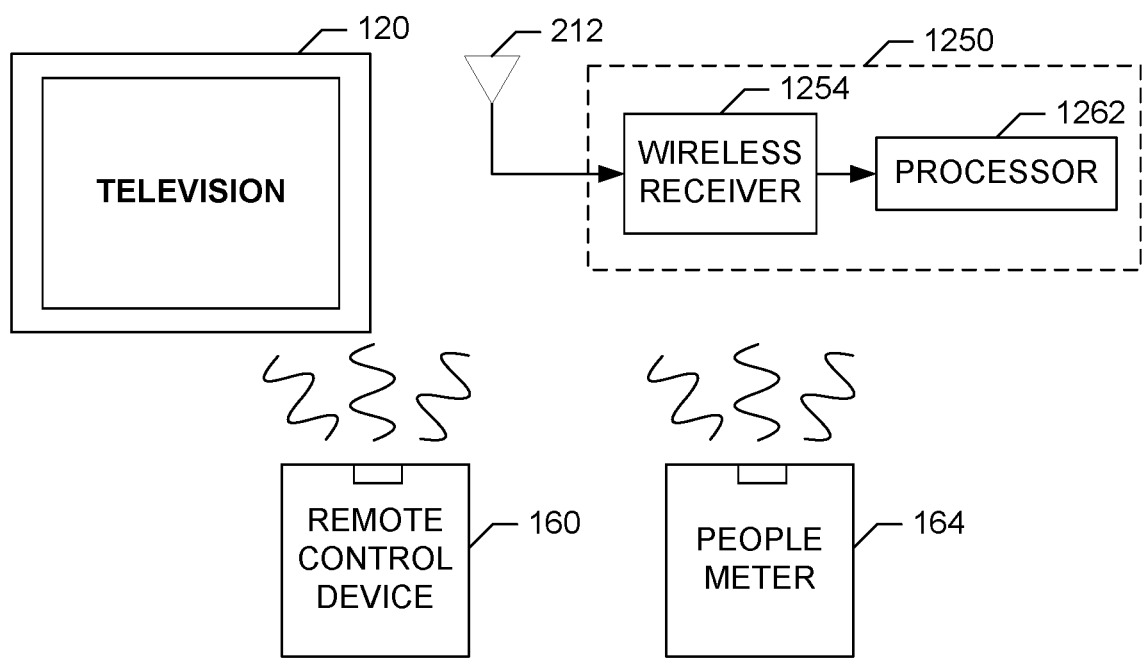
Figure 12C:
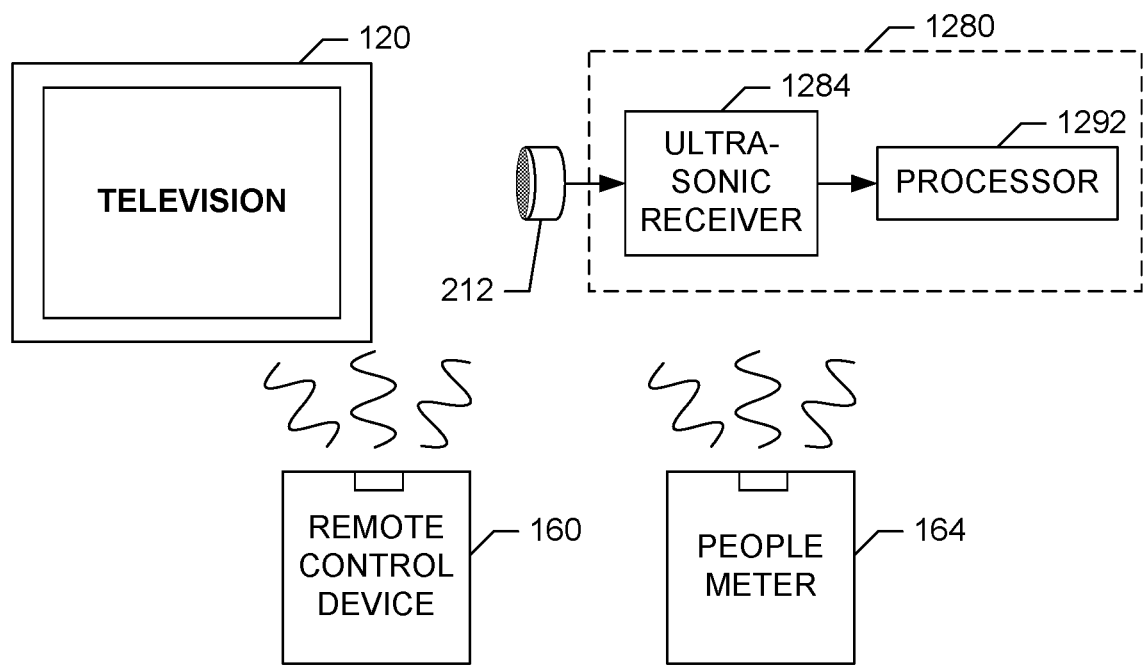

Three example remote device activity processor systems 1200, 1250 any 1280, any or all of which may be used to implement the remote control activity detector 524 and/or the people meter activity detector 528 of FIG. 5, are shown in FIGS. 12A, 12B and 12C, respectively. The example remote device activity processor systems 1200, 1250 and 1280 are configured to measure control signals transmitted by the remote control device 160 and/or by the people meter control device 164 used in conjunction with the monitored display device 120. In the first example remote device activity processor system 1200, the control signals are detected by an emission sensor 212 implemented, for example, as an infrared (IR) detector 212 for scenarios in which either or both of the remote control device 160 and/or the people meter control device 164 employ IR signal transmission. In the second example remote device activity processor system 1250, the control signals are detected by an emission sensor 212 implemented, for example, as an antenna 212 for scenarios in which either or both of the remote control device 160 and/or the people meter control device 164 employ RF signal transmission. In the third example remote device activity processor system 1280, the control signals are detected by an emission sensor 212 implemented, for example, as an ultrasonic transducer 212 for scenarios in which either or both of the remote control device 160 and/or the people meter control device 164 employ ultrasonic signal transmission. IR detectors, antennas and ultrasonic transducers are known and, as such, are not discussed further herein.

The first example remote device activity processor system 1200 includes an IR receiver 1204 to receive IR signals detected by the IR detector 212. The IR receiver 1204 generates corresponding received control signals from the IR signals and outputs the received control signals for processing by the processor 1212. The second example remote device activity processor system 1250 includes a wireless receiver 1254 to receive RF signals detected by the antenna 212. The wireless receiver 1254 generates corresponding received control signals from the RF signals and outputs the received control signals for processing by the processor 1212. The third example remote device activity processor system 1280 includes an ultrasonic receiver 1284 to receive ultrasonic signals detected by the ultrasonic transducer 212. The ultrasonic receiver 1284 generates corresponding received control signals from the ultrasonic signals and outputs the received control signals for processing by the processor 1292. The processors 1212, 1262 and 1292 may be configured to execute machine readable instructions to implement the remote control activity detector 524 and/or the people meter activity detector 528. Such machine readable instructions are discussed in greater detail below in connection with FIG. 26.

Flowcharts representative of example machine readable instructions that may be executed to implement the audio processors 228 of FIG. 3, the video processors 232 of FIG. 4, the emission processors 236 of FIG. 5 and/or the decision processor 244 of FIG. 2 are shown in FIG. 13 through 28. In these examples, the machine readable instructions represented by each flowchart may comprise one or more programs for execution by: (a) a processor, such as the processors 612, 712, 812, 912, 1012, 1112, 1212, 1262 and/or 1292, or the processor 2912 shown in the example computer 2900 discussed below in connection with FIG. 29, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processors 612, 712, 812, 912, 1012, 1112, 1212, 1262, 1292 and/or 2912, but persons of ordinary skill in the art will readily appreciate that the entire program or programs and/or portions thereof could alternatively be executed by a device other than the processors 612, 712, 812, 912, 1012, 1112, 1212, 1262, 1292 and/or 2912 and/or embodied in firmware or dedicated hardware in a well-known manner (e.g., implemented by an application specific integrated circuit (ASIC), a programmable logic device (PLD), a field programmable logic device (FPLD), discrete logic, etc.). For example, any or all of the audio processors 228, the video processors 232, the emission processors 236 and/or the decision processor 244 could be implemented by any combination of software, hardware, and/or firmware. Also, some or all of the machine readable instructions represented by the flowchart of FIGS. 13 through 28 may be implemented manually. Further, although the example machine readable instructions are described with reference to the flowcharts illustrated in FIGS. 13 through 28, persons of ordinary skill in the art will readily appreciate that many other techniques for implementing the example methods and apparatus described herein may alternatively be used. For example, with reference to the flowcharts illustrated in FIGS. 13 through 28, the order of execution of the blocks may be changed, and/or some of the blocks described may be changed, eliminated, combined and/or subdivided into multiple blocks.

Figure 13:
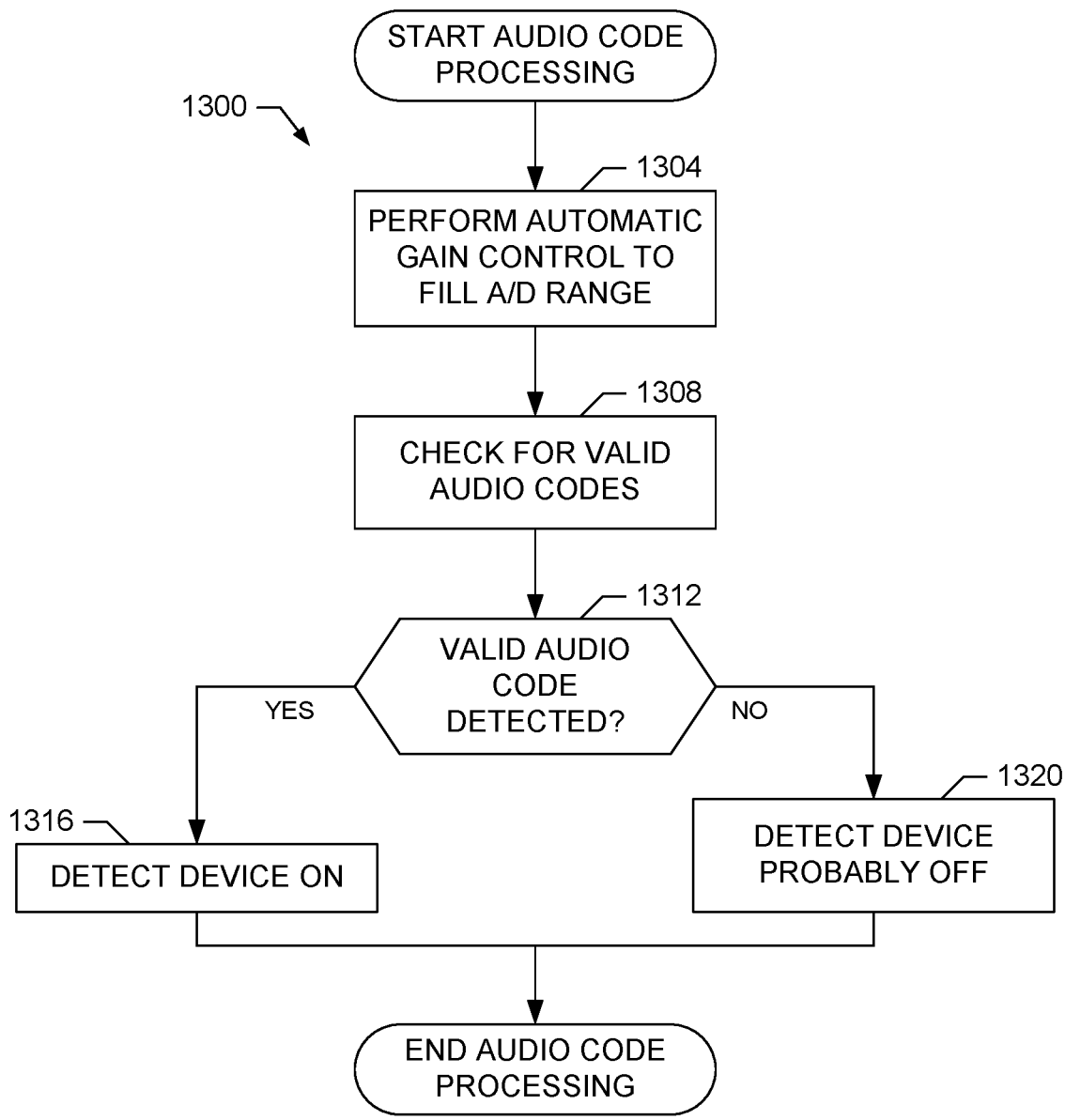
FIG. 13 is a flowchart representative of example machine readable instructions that may be executed to implement the example audio code detector of FIG. 3.

Example machine readable instructions 1300 that may be executed to implement the audio code detector 312 of FIG. 3 are shown in FIG. 13. The machine readable instructions 1300 process audio signals emitted by an information presenting device (e.g., the display device 120 of FIG. 1), detected by an audio sensor (e.g., the audio sensor 204 of FIGS. 2 and 6) and input to the audio code detector 312. The machine readable instructions 1300 may be executed periodically (e.g., as part of a program loop) and/or aperiodically (e.g., in response to one or more events) to determine whether the monitored information presenting device is ON or OFF. The machine readable instructions 1300 begin execution at block 1304 at which the audio code detector 312 performs an automatic gain control (AGC) algorithm which causes a variable gain amplifier (VGA) (e.g., the VGA 616 of FIG. 6) to amplify or attenuate the audio signal (e.g., the audio signal 230 of FIGS. 2 and 6) applied to the input of the audio code detector 312. The audio signal is amplified/attenuated to appropriately fill the dynamic range of an A/D converter (e.g., the A/D converter 604 of FIG. 6) used to sample and convert the audio signal to a digital format for further processing. An example AGC algorithm implemented by the audio code detector 312 may control the VGA to yield an output of the A/D converter having an amplitude, variance, standard deviation, energy, etc. within a predetermined range. The predetermined range is based on the characteristics of the particular A/D converter and targeted to achieve an appropriate filling of the A/D converter's dynamic range. AGC algorithms are known in the art and, as such, are not discussed further herein.

After convergence of the AGC algorithm at block 1304, control proceeds to block 1308 at which the audio code detector 312 checks for audio codes present in the received audio signal. Any appropriate technique for decoding audio codes embedded in a content presentation may be used, such as one or more of those discussed above in connection with the description of FIG. 3. If at block 1312 the audio code detector 312 detects the presence of a valid audio code, control proceeds to block 1316 at which the audio code detector 312 determines the monitored information presenting device is ON. The audio code detector 312 makes such a determination because the presence of the valid audio code indicates that the monitored information presenting device is emitting an audio signal corresponding to presented program content. If, however, at block 1312 the audio code detector 312 does not detect the presence of a valid audio code, control proceeds to block 1320 at which the audio code detector 312 determines the monitored information presenting device is probably OFF. Here, the audio code detector 312 uses the lack of a valid code to decide that the monitored information presenting device is not emitting an audio signal corresponding to presented program content and, therefore, is probably turned OFF (although the device could be operating in an audio mute state). In any case, after the audio code detector 312 makes a determination at block 1316 or block 1320, execution of the machine readable instructions 1300 ends.

Figure 14:
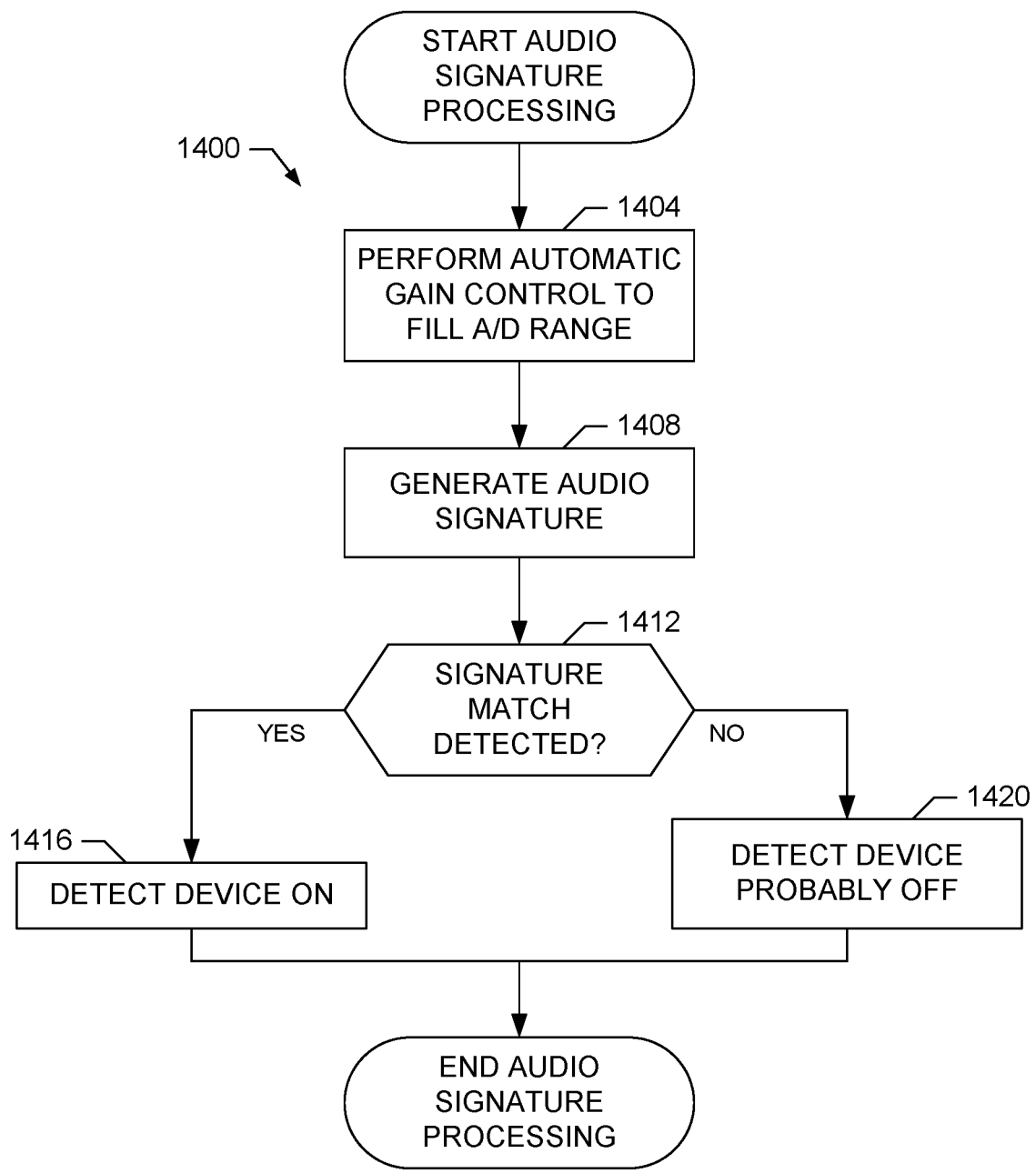
FIG. 14 is a flowchart representative of first example machine readable instructions that may be executed to implement the example audio signature processor of FIG. 3.

First example machine readable instructions 1400 that may be executed to implement the audio signature processor 316 of FIG. 3 are shown in FIG. 14. The machine readable instructions 1400 process audio signals emitted by an information presenting device (e.g., the display device 120 of FIG. 1), detected by an audio sensor (e.g., the audio sensor 204 of FIGS. 2 and 6) and input to the audio signature processor 316. The machine readable instructions 1400 may be executed periodically (e.g., as part of a program loop) and/or aperiodically (e.g., in response to one or more events) to determine whether the monitored information presenting device is ON or OFF. The machine readable instructions 1400 begin execution at block 1404 at which the audio signature processor 316 performs an AGC algorithm which causes a VGA (e.g., the VGA 616 of FIG. 6) to amplify or attenuate the audio signal (e.g., the audio signal 230 of FIGS. 2 and 6) applied to the input of the audio signature processor 316. The audio signal is amplified/attenuated to appropriately fill the dynamic range of an A/D converter (e.g., the A/D converter 604 of FIG. 6) used to sample and convert the audio signal to a digital format for further processing. AGC algorithms are discussed in greater detail above in connection with FIG. 13 and, as such, are not discussed further herein.

After convergence of the AGC algorithm at block 1404, control proceeds to block 1408 at which the audio signature processor 316 generates an audio signature from the received audio signal. Any appropriate technique for generating audio signatures based on an audio signal corresponding to a content presentation may be used, such as one or more of those discussed above in connection with the description of FIG. 3. If at block 1412 the audio signature processor 316 determines that the audio signature generates at block 1408 matches a known reference signature, control proceeds to block 1416 at which the audio signature processor 316 determines that the monitored information presenting device is ON. The audio signature processor 316 makes such a determination because the signature match indicates that the monitored information presenting device is, at least, emitting an audio signal corresponding to presented program content corresponding to the reference audio signature. If, however, at block 1412 the audio signature processor 316 does not detect a match, control proceeds to block 1420 at which the audio signature processor 316 determines that the monitored information presenting device is probably OFF. Here, the audio signature processor 316 uses the lack of a match to decide that the monitored information presenting device is not emitting an audio signal corresponding to presented program content and, therefore, is probably turned OFF (although the lack of a match could also correspond to an audio mute state, unknown program content, etc.). In any case, after audio signature processor 316 makes a determination at block 1416 or block 1420, execution of the machine readable instructions 1400 ends.

Figure 15:
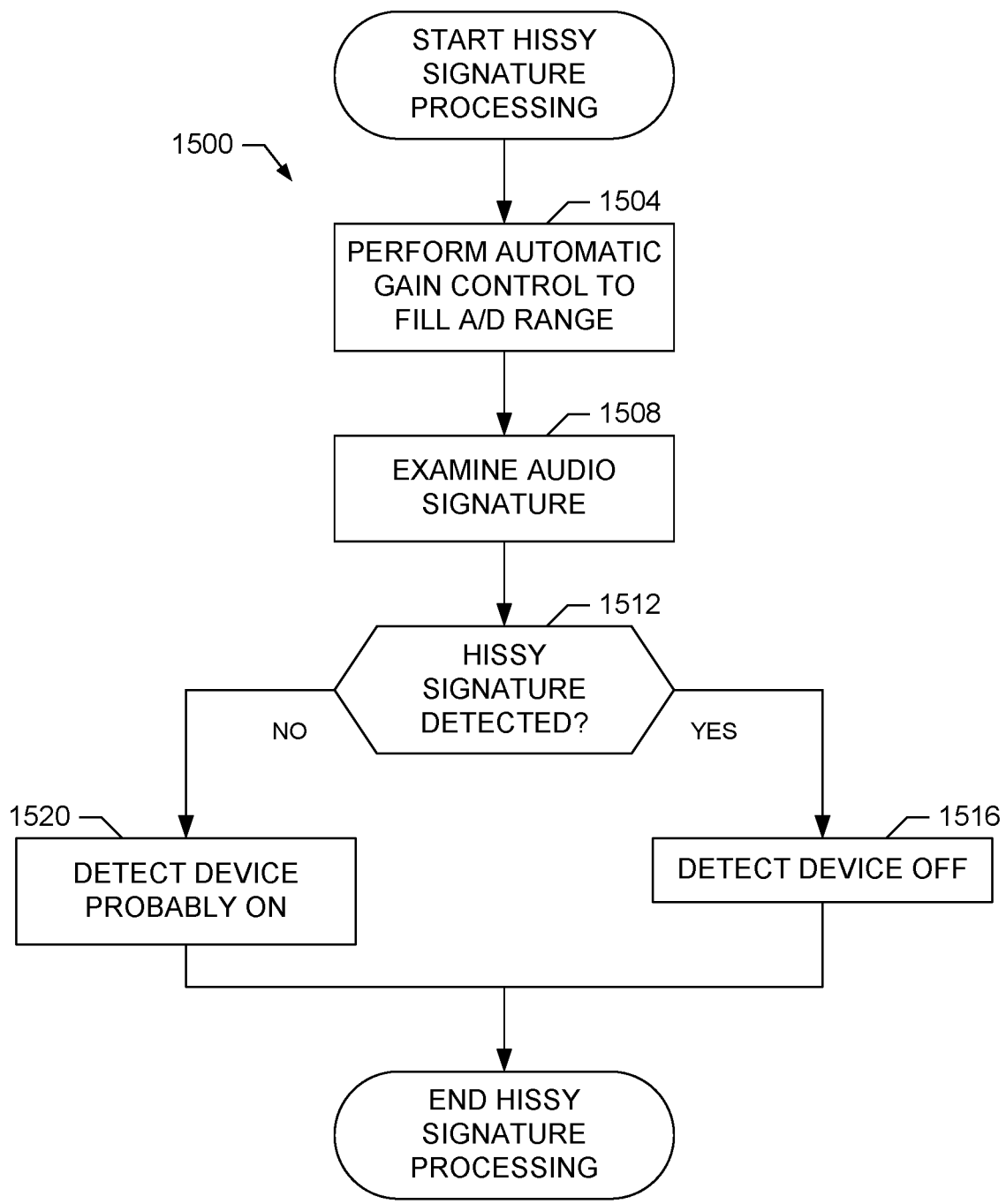
FIG. 15 is a flowchart representative of second example machine readable instructions that may be executed to implement the example audio signature processor of FIG. 3.

Second example machine readable instructions 1500 that may be executed to implement the audio signature processor 316 of FIG. 3 are shown in FIG. 15. The machine readable instructions 1500 process audio signals emitted by an information presenting device (e.g., the display device 120 of FIG. 1), detected by an audio sensor (e.g., the audio sensor 204 of FIGS. 2 and 6) and input to the audio signature processor 316. The machine readable instructions 1500 may be executed periodically (e.g., as part of a program loop) and/or aperiodically (e.g., in response to one or more events) to determine whether the monitored information presenting device is ON or OFF. The machine readable instructions 1500 begin execution at block 1504 at which the audio signature processor 316 performs an AGC algorithm which causes a VGA (e.g., the VGA 616 of FIG. 6) to amplify or attenuate the audio signal (e.g., the audio signal 230 of FIGS. 2 and 6) applied to the input of the audio signature processor 316. The audio signal is amplified/attenuated to appropriately fill the dynamic range of an A/D converter (e.g., the A/D converter 604 of FIG. 6) used to sample and convert the audio signal to a digital format for further processing. AGC algorithms are discussed in greater detail above in connection with FIG. 13 and, as such, are not discussed further herein.

After convergence of the AGC algorithm at block 1504, control proceeds to block 1508 at which the audio signature processor 316 generates an audio signature from the received audio signal. Any appropriate technique for generating audio signatures based on an audio signal corresponding to a content presentation may be used, such as one or more of those discussed above in connection with the description of FIG. 3.

Control then proceeds to block 1512 at which the audio signature processor 316 determines whether the audio signature generates at block 1508 may be characterized as "hissy." Typically, an audio signal corresponding to audible program content exhibits significant peak energy fluctuations caused by the varying pressure wave associated with the audio emissions. Conversely, an audio signal corresponding to background noise or silence exhibits relatively small peak energy fluctuations about an average energy value resulting in sound typically characterized as "hissy." Thus, the audio signature processor 316 may evaluate whether the audio signature generated at block 1508 is hissy to determine whether a monitored information presenting device is emitting an audio signal corresponding to audible program content. In an example hissy audio signature detection algorithm, the audio signature processor 316 may compute a running average of peak energy values of the audio signal. Then, if a particular peak energy value is within some region about this running average, the audio signature processor 316 may determine that a possible hissy state has been entered. If such a possible hissy state exists for a period of time (e.g., three seconds), the audio signature processor 316 may decide that a definite hissy state has been entered and declare the generated audio signature to be hissy. Persons of ordinary skill in the art will appreciate that many techniques may be used to determine whether an audio signature is hissy or, in other words, corresponds to silence or background noise. For example, the average time between audio energy peaks or the variability of the standard deviation of the audio energy peaks may be used to determine whether the audio signal energy fluctuates sufficiently to indicate the presence of an audio content presentation or is relatively static and, therefore, indicative of silence or background noise.

Returning to FIG. 15, if at block 1512 the audio signature processor 316 determines that the audio signature generated at block 1408 is hissy, control proceeds to block 1516 at which the audio signature processor 316 determines that the monitored information presenting device is OFF. The audio signature processor 316 makes such a determination because a hissy signature indicates that the received audio signal corresponds most likely to background noise and not audio emanating from the monitored information presenting device, thereby indicating that the information presenting device is OFF. If, however, at block 1512 the audio signature processor 316 determines that the generated audio signature is not hissy, control proceeds to block 1520 at which the audio signature processor 316 determines that the monitored information presenting device is probably ON. Here, the audio signature processor 316 uses the lack of a hissyness to decide that the monitored information presenting device is probably emitting an audio signal corresponding to presented program content and, therefore, is probably turned ON. In any case, after audio signature processor 316 makes a determination at block 1516 or block 1520, execution of the machine readable instructions 1500 ends.

Figure 16:
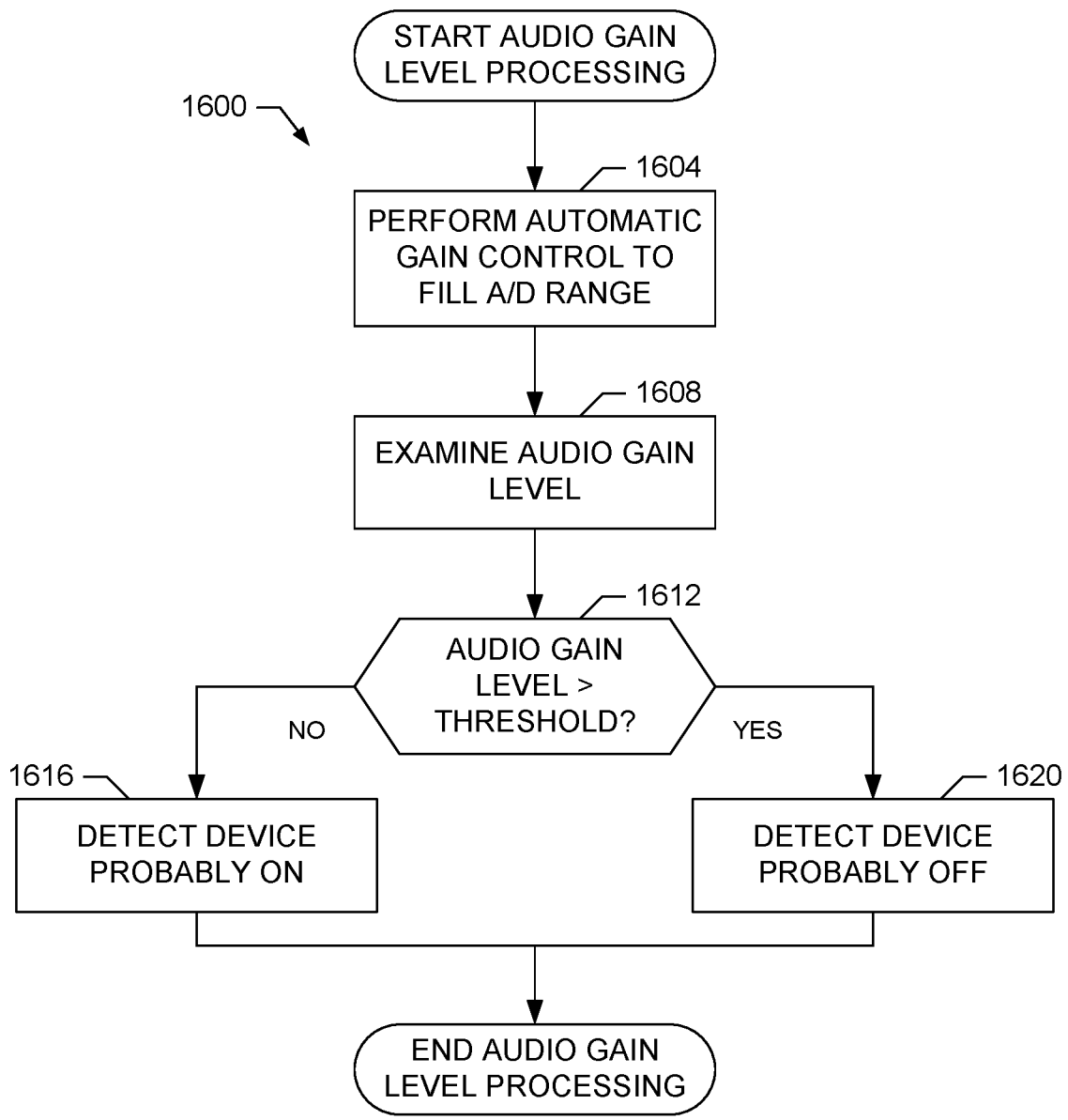
FIG. 16 is a flowchart representative of example machine readable instructions that may be executed to implement the example audio gain level processor of FIG. 3.

Example machine readable instructions 1600 that may be executed to implement the audio gain level processor 320 of FIG. 3 are shown in FIG. 16. The machine readable instructions 1600 process audio signals emitted by an information presenting device (e.g., the display device 120 of FIG. 1), detected by an audio sensor (e.g., the audio sensor 204 of FIGS. 2 and 6) and input to the audio gain level processor 320. The machine readable instructions 1600 may be executed periodically (e.g., as part of a program loop) and/or aperiodically (e.g., in response to one or more events) to determine whether the monitored information presenting device is ON or OFF. The machine readable instructions 1600 begin execution at block 1604 at which the audio gain level processor 320 performs an AGC algorithm which causes a VGA (e.g., the VGA 616 of FIG. 6) to amplify or attenuate the audio signal (e.g., the audio signal 230 of FIGS. 2 and 6) applied to the input of the audio gain level processor 320. The audio signal is amplified/attenuated to appropriately fill the dynamic range of an A/D converter (e.g., the A/D converter 604 of FIG. 6) used to sample and convert the audio signal to a digital format for further processing. AGC algorithms are discussed in greater detail above in connection with FIG. 13 and, as such, are not discussed further herein.

After convergence of the AGC algorithm at block 1604, control proceeds to block 1608 at which the audio gain level processor 320 examines the steady-state audio gain level to which the AGC algorithm converged at block 1604. In particular, the audio gain level processor 320 determines whether the steady-state audio gain level exceeds a predetermined threshold indicative of the AGC algorithm converging to a large, possibly maximum, gain. Such a large/maximum convergence would occur of the input audio signal corresponded to silence or background noise. If at block 1612 the audio gain level processor 320 determines that the steady-state audio gain level achieved at block 1604 does not exceed the predetermined threshold, control proceeds to block 1616 at which the audio gain level processor 320 determines that the monitored information presenting device is probably ON. The audio gain level processor 320 makes such a determination because the steady-state gain level indicates that an audio signal emitted from the monitored information presenting device was probably detected and provided as input to the audio gain level processor 320. If, however, at block 1612 the steady-state audio gain level exceeds the threshold, control proceeds to block 1620 at which audio gain level processor 320 determines that the monitored information presenting device is probably OFF. Here, the audio gain level processor 320 uses the large/maximum steady-state audio gain to decide that the monitored information presenting device is probably not emitting an audio signal corresponding to presented program content and, therefore, is probably turned OFF. In any case, after audio gain level processor 320 makes a determination at block 1616 or block 1620, execution of the machine readable instructions 1600 ends.

Figure 17:
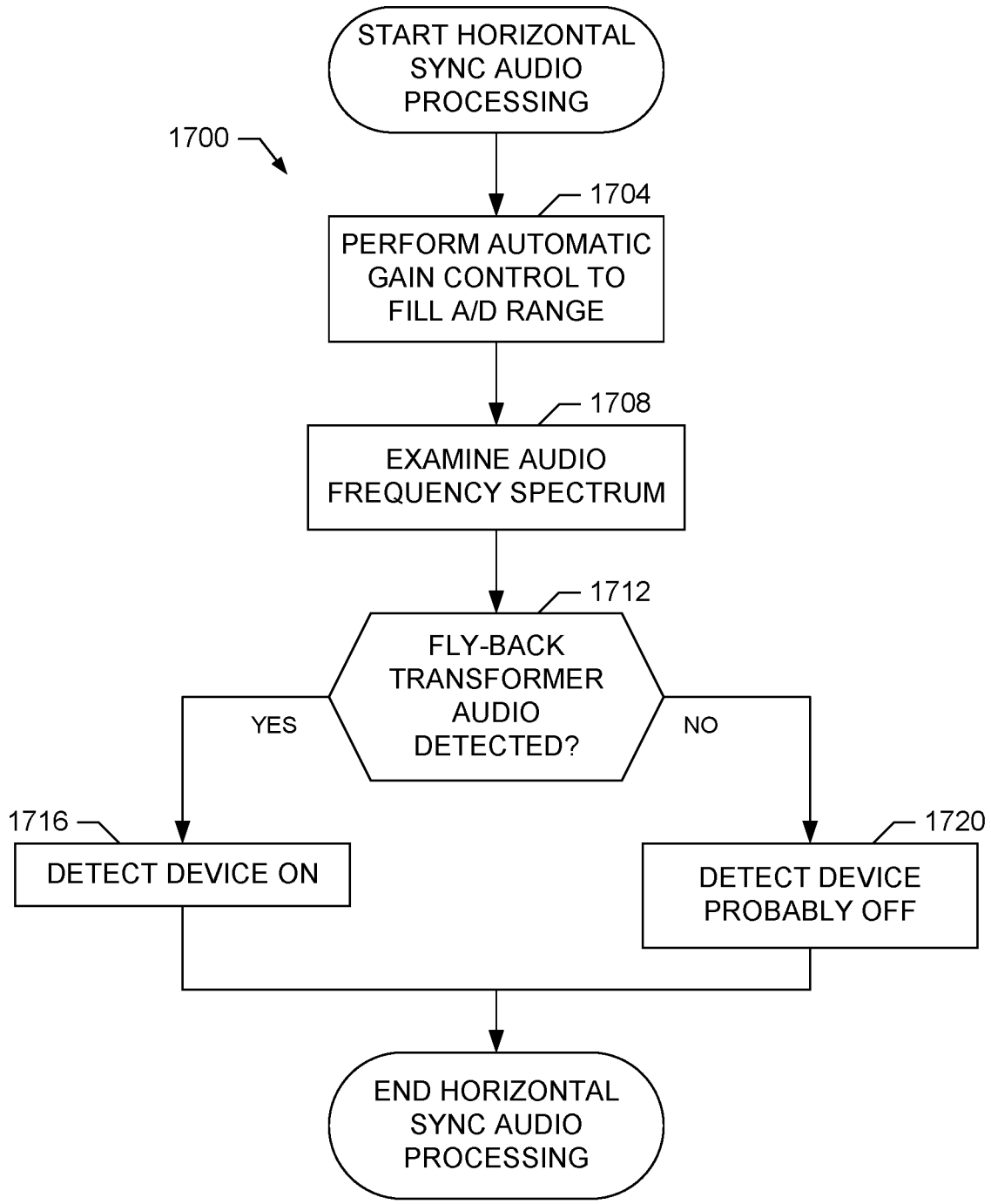
FIG. 17 is a flowchart representative of example machine readable instructions that may be executed to implement the example horizontal sync audio processor of FIG. 3.

Example machine readable instructions 1700 that may be executed to implement the horizontal sync audio processor 324 of FIG. 3 are shown in FIG. 17. The machine readable instructions 1700 process audio noise signals emitted by, for example, a horizontal scan fly-back transformer of an information presenting device (e.g., the display device 120 of FIG. 1), detected by an audio sensor (e.g., the audio sensor 204 of FIGS. 2 and 6) and input to the horizontal sync audio processor 324. The machine readable instructions 1700 may be executed periodically (e.g., as part of a program loop) and/or aperiodically (e.g., in response to one or more events) to determine whether the monitored information presenting device is ON or OFF. The machine readable instructions 1700 begin execution at block 1704 at which the horizontal sync audio processor 324 performs an AGC algorithm which causes a VGA (e.g., the VGA 616 of FIG. 6) to amplify or attenuate the audio signal (e.g., the audio signal 230 of FIGS. 2 and 6) applied to the input of the horizontal sync audio processor 324. The audio signal is amplified/attenuated to appropriately fill the dynamic range of an A/D converter (e.g., the A/D converter 604 of FIG. 6) used to sample and convert the audio signal to a digital format for further processing. AGC algorithms are discussed in greater detail above in connection with FIG. 13 and, as such, are not discussed further herein.

After convergence of the AGC algorithm at block 1704, control proceeds to block 1708 at which the horizontal sync audio processor 324 examines the frequency spectrum of the input audio signal for characteristics corresponding to audio emitted by a fly-back transformer. For example, and as discussed above in connection with FIG. 3, a fly-back transformer used in an information presenting device operating in accordance with the NTSC standard may generate tonal audio emissions having a frequency of approximately 15.75 kHz. Therefore, if at block 1712 the horizontal sync audio processor 324 detects the presence of audio frequency tones indicative of a fly-back transformer, control proceeds to block 1716 at which the horizontal sync audio processor 324 determines the monitored information presenting device is ON. The horizontal sync audio processor 324 makes such a determination because the presence of audio emissions corresponding to a fly-back transformer indicates that the monitored information presenting device is operating in an active state. If, however, at block 1712 the horizontal sync audio processor 324 does not detect the presence of audio frequency tones indicative of a fly-back transformer, control proceeds to block 1720 at which the horizontal sync audio processor 324 determines the monitored information presenting device is probably OFF. Here, the horizontal sync audio processor 324 uses the lack of audio emissions corresponding to a fly-back transformer to decide that the monitored information presenting device is probably not operating and, therefore, is probably turned OFF. In any case, after the horizontal sync audio processor 324 makes a determination at block 1716 or block 1720, execution of the machine readable instructions 1700 ends.

Figure 18:
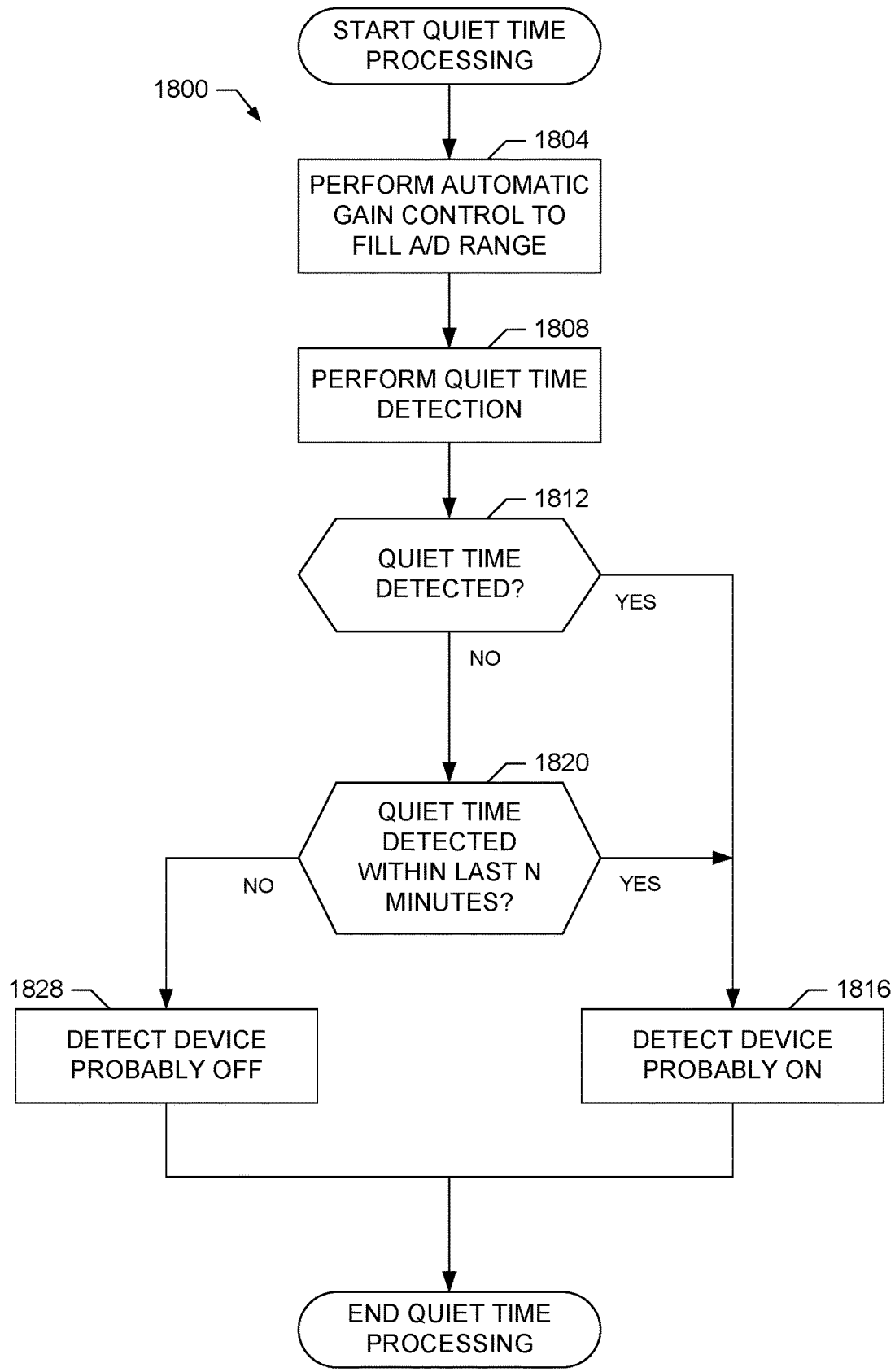
FIG. 18 is a flowchart representative of example machine readable instructions that may be executed to implement the example quiet time detector of FIG. 3.

Example machine readable instructions 1800 that may be executed to implement the quiet time detector 328 of FIG. 3 are shown in FIG. 18. The machine readable instructions 1800 process audio signals emitted by an information presenting device (e.g., the display device 120 of FIG. 1), detected by an audio sensor (e.g., the audio sensor 204 of FIGS. 2 and 6) and input to the audio gain level processor 320. The machine readable instructions 1800 may be executed periodically (e.g., as part of a program loop) and/or aperiodically (e.g., in response to one or more events) to determine whether the monitored information presenting device is ON or OFF. The machine readable instructions 1800 begin execution at block 1804 at which the quiet time detector 328 performs an AGC algorithm which causes a VGA (e.g., the VGA 616 of FIG. 6) to amplify or attenuate the audio signal (e.g., the audio signal 230 of FIGS. 2 and 6) applied to the input of the quiet time detector 328. The audio signal is amplified/attenuated to appropriately fill the dynamic range of an A/D converter (e.g., the A/D converter 604 of FIG. 6) used to sample and convert the audio signal to a digital format for further processing. AGC algorithms are discussed in greater detail above in connection with FIG. 13 and, as such, are not discussed further herein.

After convergence of the AGC algorithm at block 1804, control proceeds to block 1808 at which the quiet time detector 328 performs a quiet time detector algorithm to determine whether the audio signal includes any periods of silence indicative of, for example, a channel change operation, a transition between broadcast program content and a commercial, etc. Any appropriate technique for detecting intervals of quiet time based on an audio signal corresponding to a content presentation may be used, such as the technique discussed above in connection with the description of FIG. 3. If at block 1812 the quiet time detector 328 determines that a quiet time interval was detected at block 1808, control proceeds to block 1816 at which the quiet time detector 328 determines that the monitored information presenting device is probably ON. The quiet time detector 328 makes such a determination because the audio signal emitted from the monitored information presenting device includes quiet time intervals probably indicative of short interruptions of program content presented by an actively-operating information presenting device.

If, however, at block 1812 a quiet time interval is not detected, control proceeds to block 1820 at which the quiet time detector 328 determines whether a quiet time interval was detected within a predetermined preceding interval of time. If at block 1820 the quiet time detector 328 determines that a quiet time interval was detected within the preceding interval of time, control proceeds to block 1816 at which the quiet time detector 328 determines that the monitored information presenting device is probably ON. The quiet time detector 328 makes such a determination because the audio signal emitted from the monitored information presenting device recently included quiet time intervals probably indicative of short interruptions of program content presented by an actively-operating information presenting device. If, however, at block 1820 the quiet time detector 328 determines that a quiet time interval was also not detected within the predetermined preceding interval of time, control proceeds to block 1828 at which the quiet time detector 328 determines that the monitored information presenting device is probably OFF. Here, the quiet time detector 328 uses the lack of a quiet time interval within the predetermined period of time to decide that the monitored information presenting device is probably not emitting an audio signal corresponding to presented program content and, therefore, is probably turned OFF. In any case, after quiet time detector 328 makes a determination at block 1816 or block 1828, execution of the machine readable instructions 1800 ends.

Figure 19:
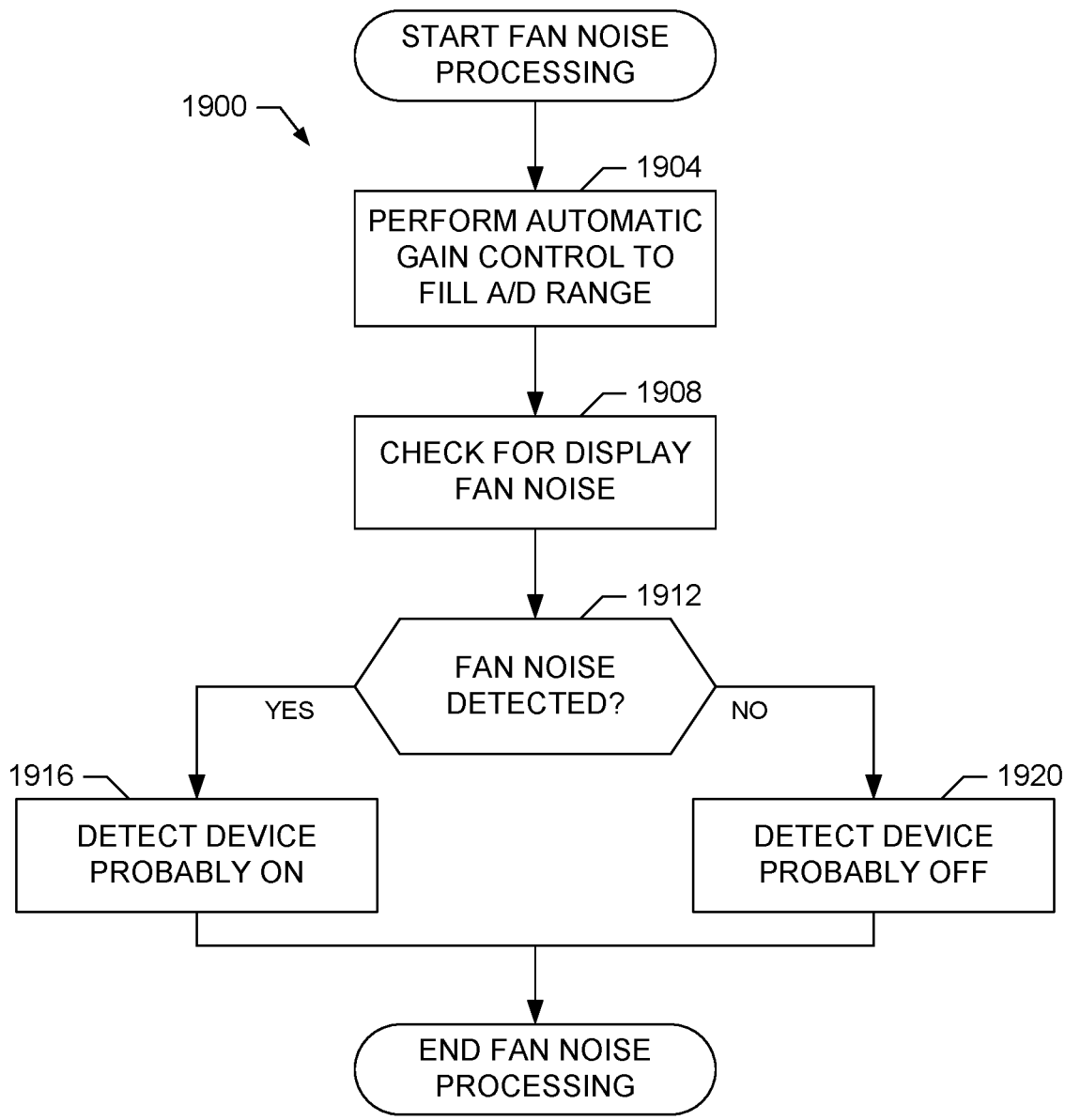
FIG. 19 is a flowchart representative of example machine readable instructions that may be executed to implement the example fan noise detector of FIG. 3.

Example machine readable instructions 1900 that may be executed to implement the fan noise detector 332 of FIG. 3 are shown in FIG. 19. The machine readable instructions 1900 process audio signals emitted by an information presenting device (e.g., the display device 120 of FIG. 1), detected by an audio sensor (e.g., the audio sensor 204 of FIGS. 2 and 6) and input to the fan noise detector 332. The machine readable instructions 1900 may be executed periodically (e.g., as part of a program loop) and/or aperiodically (e.g., in response to one or more events) to determine whether the monitored information presenting device is ON or OFF. The machine readable instructions 1900 begin execution at block 1904 at which the fan noise detector 332 performs an AGC algorithm which causes a VGA (e.g., the VGA 616 of FIG. 6) to amplify or attenuate the audio signal (e.g., the audio signal 230 of FIGS. 2 and 6) applied to the input of the fan noise detector 332. The audio signal is amplified/attenuated to appropriately fill the dynamic range of an A/D converter (e.g., the A/D converter 604 of FIG. 6) used to sample and convert the audio signal to a digital format for further processing. AGC algorithms are discussed in greater detail above in connection with FIG. 13 and, as such, are not discussed further herein.

After convergence of the AGC algorithm at block 1904, control proceeds to block 1908 at which the fan noise detector 332 checks for the presence of fan noise in the received audio signal. Fan noise from an operating information presenting device typically exhibits tonal energy in the frequency range between 300 Hz and 5 kHz. As such, any known technique for detecting tonal audio signals in this (or any other appropriate) frequency range may be used at block 1908. If at block 1912 the fan noise detector 332 detects the presence of fan noise, control proceeds to block 1916 at which the fan noise detector 332 determines the monitored information presenting device is probably ON. The fan noise detector 332 makes such a determination because the presence of fan noise indicates that the monitored information presenting device is probably operating and presenting program content. If, however, at block 1912 the fan noise detector 332 does not detect the presence of fan noise, control proceeds to block 1920 at which the fan noise detector 332 determines the monitored information presenting device is probably OFF. Here, the fan noise detector 332 uses the lack of fan noise to decide that the monitored information presenting device is probably not operating and, therefore, is probably turned OFF. In any case, after the fan noise detector 332 makes a determination at block 1916 or block 1920, execution of the machine readable instructions 1900 ends.

Figure 20:
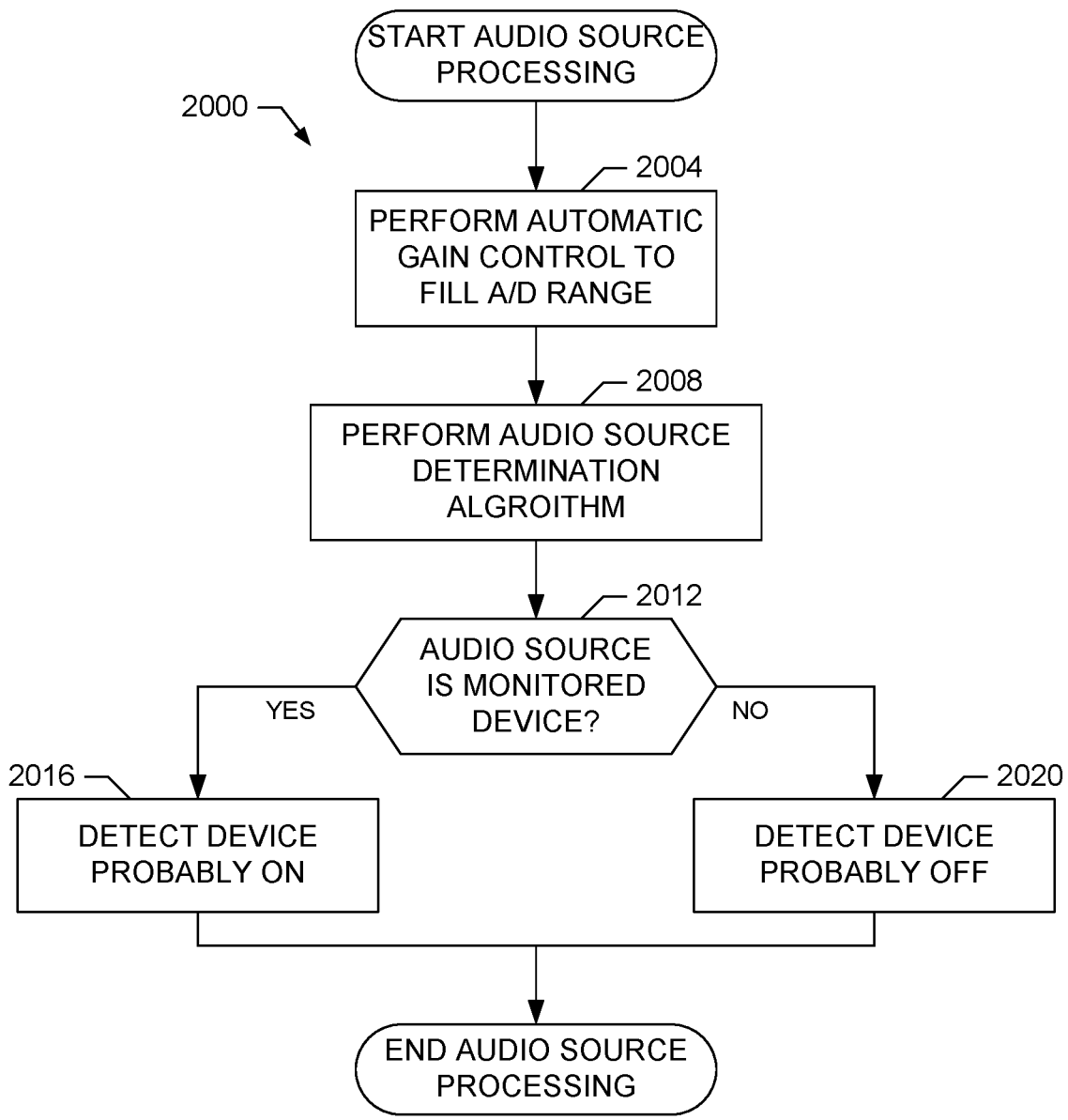
FIG. 20 is a flowchart representative of example machine readable instructions that may be executed to implement the example audio source detector of FIG. 3.

Example machine readable instructions 2000 that may be executed to implement the audio source detector 336 of FIG. 3 are shown in FIG. 20. The machine readable instructions 2000 process audio signals emitted by an information presenting device (e.g., the display device 120 of FIG. 1), detected by audio sensors (e.g., the audio sensors 204A-B of FIG. 7) and input to the audio source detector 336. The machine readable instructions 20000 may be executed periodically (e.g., as part of a program loop) and/or aperiodically (e.g., in response to one or more events) to determine whether the monitored information presenting device is ON or OFF. The machine readable instructions 2000 begin execution at block 2004 at which the audio source detector 336 performs AGC algorithms which cause VGAs (e.g., the VGAs 716A-B of FIG. 7) to amplify or attenuate audio signals (e.g., the audio signals 230A-B of FIG. 7) applied to the inputs of the audio source detector 336. The audio signals are amplified/attenuated to appropriately fill the dynamic range of A/D converters (e.g., the A/D converters 704A-B of FIG. 7) used to sample and convert the audio signals to a digital format for further processing. AGC algorithms are discussed in greater detail above in connection with FIG. 13 and, as such, are not discussed further herein.

After convergence of the AGC algorithms at block 2004, control proceeds to block 2008 at which the audio source detector 336 performs a source detection algorithm to determine the source of the input audio signals. Any appropriate technique for audio source detection may be used, such as one or more of those discussed above in connection with the description of FIG. 3. Next, if at block 2012 the audio source detector 336 determines that the audio source location coincides with the location of the monitored information presenting device, control proceeds to block 2016 at which the audio source detector 336 determines the monitored information presenting device is probably ON. The audio source detector 336 makes such a determination because the audio source detection algorithm performed at block 2008 detected audio probably emanating from the monitored information presenting device and corresponding to presented program content. If, however, at block 2012 the location of the detected audio source does not correspond with the monitored information presenting device, control proceeds to block 2020 at which the audio source detector 336 determines the monitored information presenting device is probably OFF. Here, the audio source detector 336 decides the input audio signal probably does not correspond to the monitored information presenting device and, thus, the information presenting device is probably OFF. In any case, after the audio source detector 336 makes a determination at block 2016 or block 2020, execution of the machine readable instructions 2000 ends.

Figure 21:
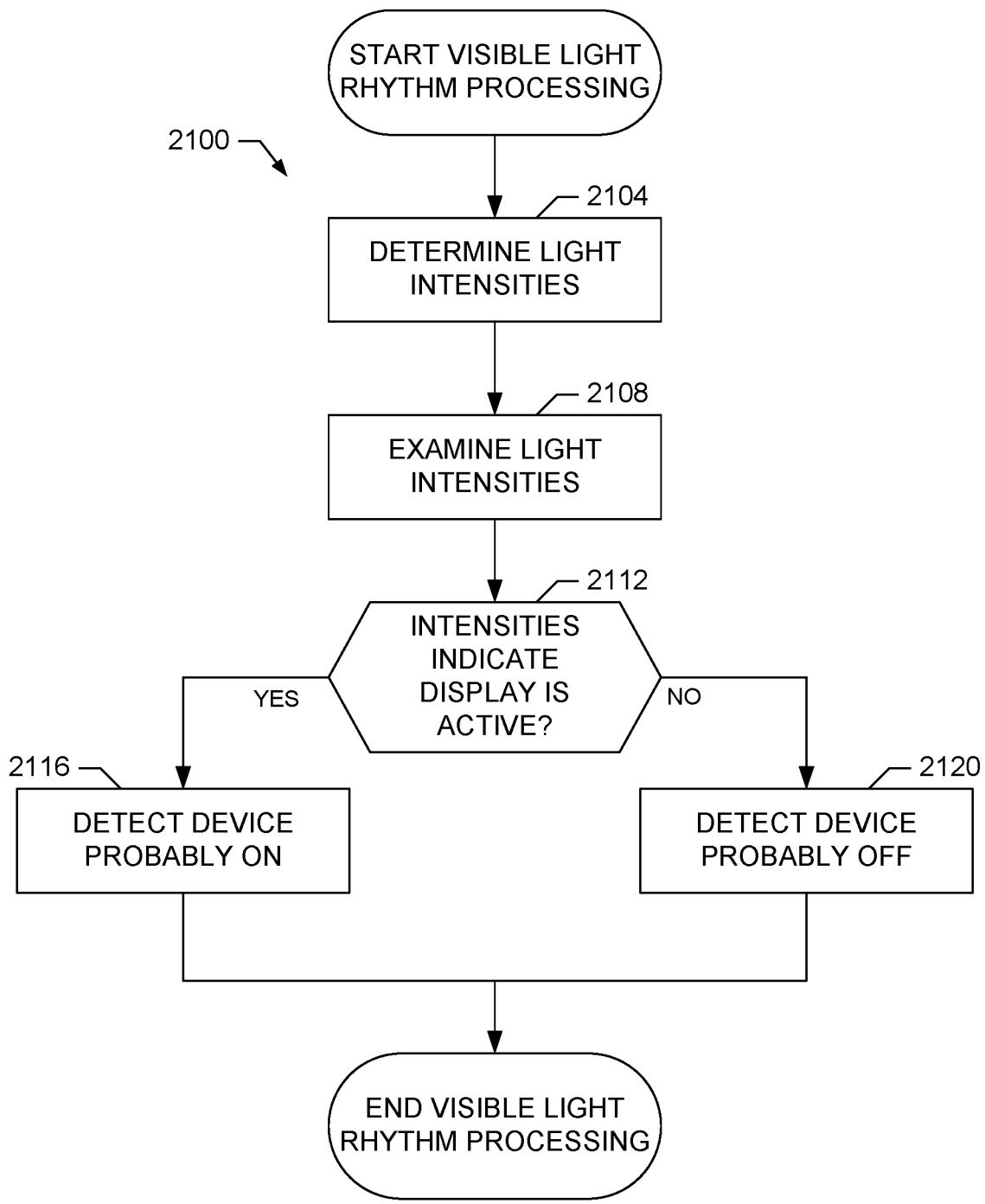
FIG. 21 is a flowchart representative of example machine readable instructions that may be executed to implement the example visible light rhythm processor of FIG. 4.

Example machine readable instructions 2100 that may be executed to implement the visible light rhythm processor 412 of FIG. 4 are shown in FIG. 21. The machine readable instructions 2100 process visible light emitted by the display of an information presenting device (e.g., the display device 120 of FIG. 1). The emitted light is detected by a video sensor (e.g., the video sensor 208 of FIGS. 2 and 8) positioned to monitor the display of the monitored information presenting device (hereinafter referred to as the monitored display). The video sensor converts the emitted light to an electrical signal which is input to the visible light rhythm processor 412. The machine readable instructions 2100 may be executed periodically (e.g., as part of a program loop) and/or aperiodically (e.g., in response to one or more events) to determine whether the monitored information presenting device is ON or OFF.

The machine readable instructions 2100 begin execution at block 2104 at which the visible light rhythm processor 412 determines the intensity of the light detected by the video sensor by sampling the signal provided by the video sensor. Next, control proceeds to block 2108 at which the visible light rhythm processor 412 examines the light intensities, for example, over a predetermined interval of time. If at block 2112 the visible light rhythm processor 412 determines that the light intensities indicate that the monitored display is active, control proceeds to block 2116 at which the visible light rhythm processor 412 determines that the monitored information presenting device is probably ON. The visible light rhythm processor 412 makes such a determination, for example, by comparing the light intensities to a predetermined threshold corresponding to a light intensity visible to the human eye and, therefore, probably indicative of the information presenting device displaying active program content. If, however, at block 2112 the visible light rhythm processor 412 determines that the light intensities do not indicate that the monitored display is active, control proceeds to block 2120 at which the visible light rhythm processor 412 determines that the monitored information presenting device is probably OFF. Here, the lack of detected light intensities which would be visible to the human eye probably indicates that the monitored information presenting device is inactive and, therefore, probably turned OFF. In any case, after the visible light rhythm processor 412 makes a determination at block 2116 or block 2120, execution of the machine readable instructions 2100 ends.

Figure 22:
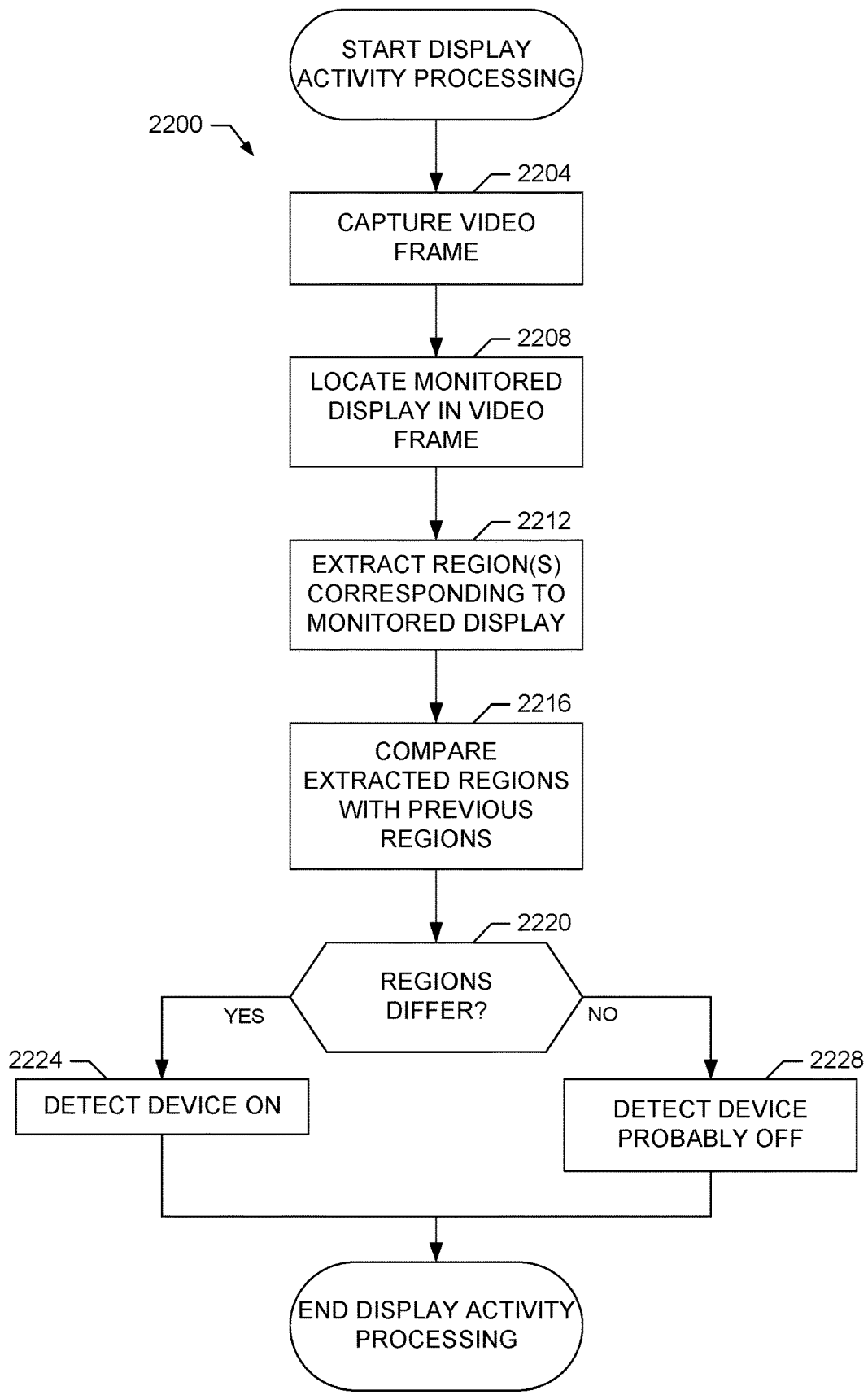
FIG. 22 is a flowchart representative of example machine readable instructions that may be executed to implement the example display activity detector of FIG. 4.

Example machine readable instructions 2200 that may be executed to implement the display activity detector 416 of FIG. 4 are shown in FIG. 22. The machine readable instructions 2200 process video images corresponding to an area including the display of an information presenting device (e.g., the display device 120 of FIG. 1). The video images are detected by a video sensor (e.g., the video sensor 208 of FIGS. 2 and 8) and input to the display activity detector 416. The video sensor is positioned to monitor an area including the display of the monitored information presenting device (hereinafter referred to as the monitored display). The machine readable instructions 2200 may be executed periodically (e.g., as part of a program loop) and/or aperiodically (e.g., in response to one or more events) to determine whether the monitored information presenting device is ON or OFF.

The machine readable instructions 2200 begin execution at block 2204 at which the display activity detector 416 captures video frames based on the video signal (e.g., the video signal 234 of FIGS. 2 and 8) applied to the input of the display activity detector 416. As discussed above, the display activity detector 416 may use a frame grabber (e.g., the frame grabber 804 of FIG. 8) to capture the video frames. After the video frames are captured at 2204, control proceeds to block 2208 at which the display activity detector 416 locates the monitored display in the captured video frames. Control then proceeds to block 2212 at which the display activity detector 416 extracts one or more regions corresponding to the monitored display from each captured video frame. Then, at block 2216, the display activity detector 416 compares the extracted regions between successive video frames to determine whether the regions differ. For example, the display activity detector 416 may compute a distance metric between the same regions in successive video frames. Then, if the distance metric exceeds a predetermined threshold, the display activity detector 416 may determine that a change has occurred in the region over time.

Returning to FIG. 22, if at block 2220 the display activity detector 416 detects that the extracted regions differ between successive video frames, control proceeds to block 2224 at which the display activity detector 416 determines the monitored information presenting device is ON. The display activity detector 416 makes such a determination because the change in the extracted regions indicate that the monitored display is displaying a changing video presentation and, thus, that the monitored information presenting device is ON. If, however, at block 2220 the display activity detector 416 does not detect a difference between the extracted regions, control proceeds to block 2228 at which the display activity detector 416 determines the monitored information presenting device is probably OFF. Here, the display activity detector 416 uses the lack of a change in the extracted regions to decide that the monitored display is not displaying a changing video presentation and, therefore, the monitored information presenting device is probably turned OFF.

The display activity detector 416 may be configured to increase the confidence of the OFF decision by examining, for example, the color of the extracted region. If the color of the extracted region is a uniform dark color (e.g., black), the display activity detector 416 may determine that the monitored display is more likely turned OFF than, for example, displaying a paused video image. In any case, after the display activity detector 416 makes a determination at block 2224 or block 2228, execution of the machine readable instructions 2200 ends.

Figure 23:
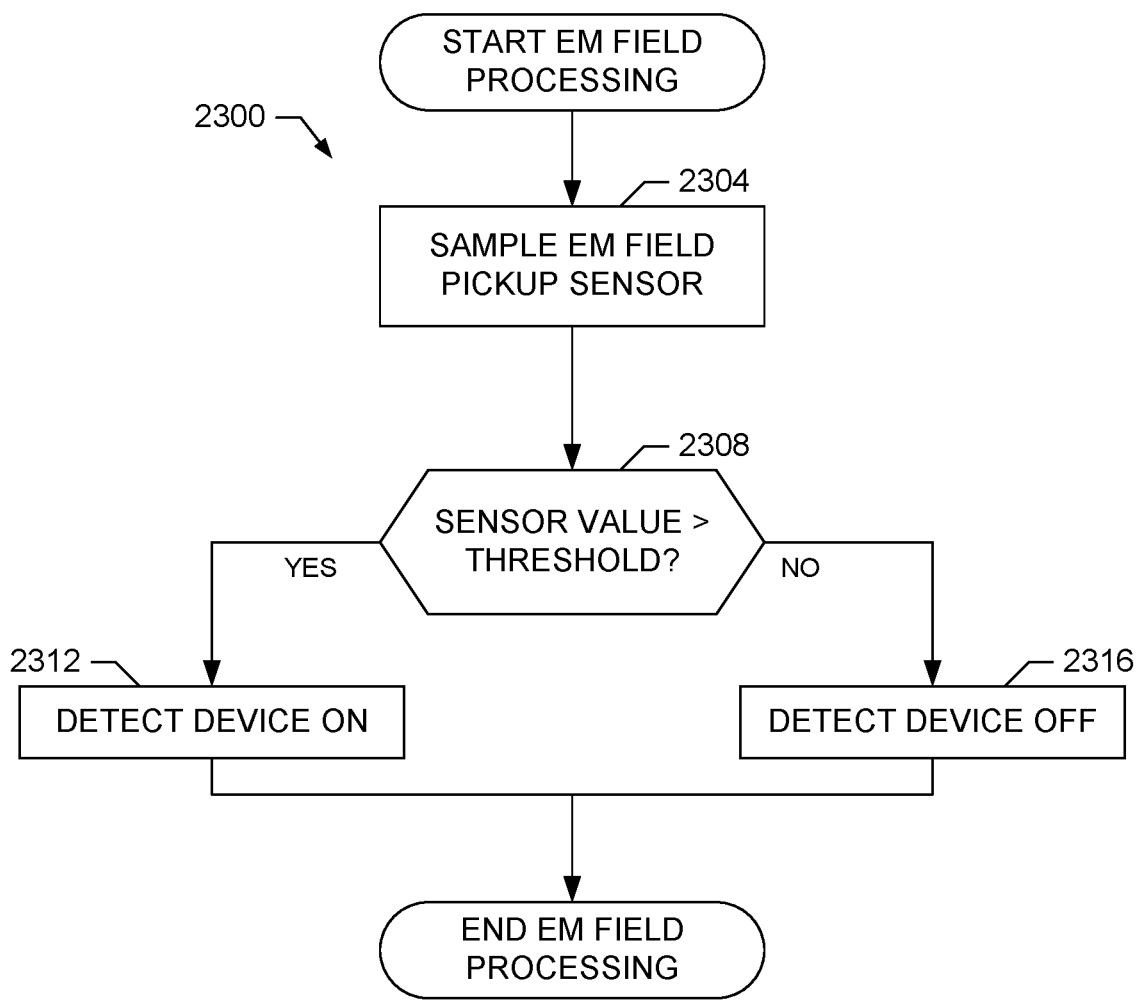
FIG. 23 is a flowchart representative of example machine readable instructions that may be executed to implement the example electromagnetic field detector of FIG. 5.

Example machine readable instructions 2300 that may be executed to implement the electromagnetic (EM) field detector 512 of FIG. 5 are shown in FIG. 23. The machine readable instructions 2300 process an EM field signal corresponding to an EM field emitted by an information presenting device (e.g., the display device 120 of FIG. 1), detected by an emission sensor (e.g., the emission sensor 212 of FIGS. 2 and 9A-B) and input to the EM field detector 512. The machine readable instructions 2300 may be executed periodically (e.g., as part of a program loop) and/or aperiodically (e.g., in response to one or more events) to determine whether the monitored information presenting device is ON or OFF. The machine readable instructions 2300 begin execution at block 2304 at which the EM field detector 512 samples the input EM field signal. After sampling the input EM field signal, control proceeds to block 2308 at which the EM field detector 512 compares the sampled EM field signal to a predetermined threshold determined, for example, by a calibration procedure which measures the background EM field in an area surrounding the monitored information presenting device.

If at block 2308 the EM field detector 512 determines that the sampled EM field signal exceeds the threshold, control proceeds to block 2312 at which the EM field detector 512 determines the monitored information presenting device is ON. The EM field detector 512 makes such a determination because the presence of an EM field exceeding the predetermined threshold indicates that the monitored information presenting device is turned ON and operating in an active mode. If, however, at block 2308 the EM field detector 512 determines that the EM field signal does not exceed the threshold, control proceeds to block 2316 at which the EM field detector 512 determines the monitored information presenting device is OFF. Here, the EM field detector 512 uses the lack of a significant EM field to decide that the monitored information presenting device is not operating in an active mode and, therefore, is turned OFF. In any case, after the EM field detector 512 makes a determination at block 2312 or block 2316, execution of the machine readable instructions 2300 ends.

Figure 24:
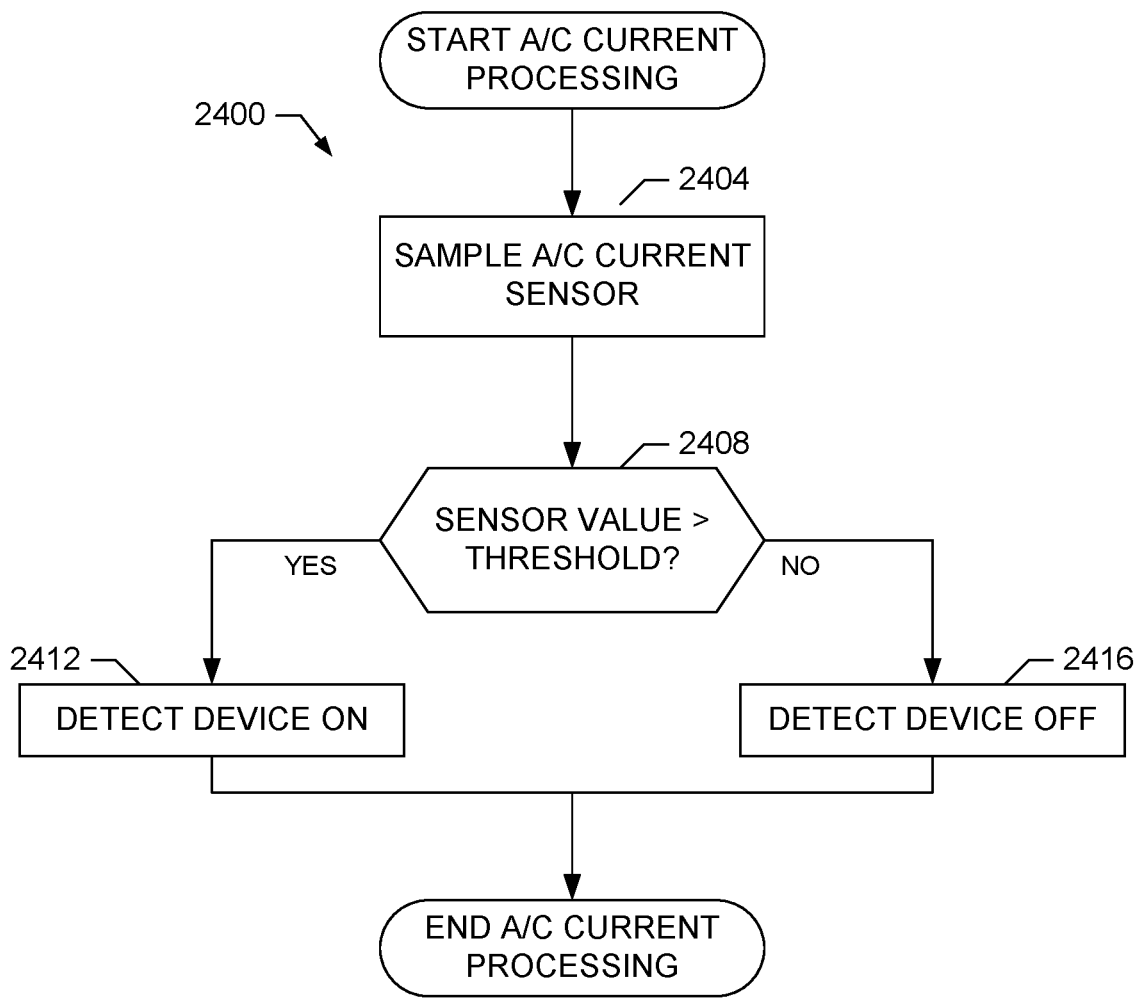
FIG. 24 is a flowchart representative of example machine readable instructions that may be executed to implement the example current detector of FIG. 5.

Example machine readable instructions 2400 that may be executed to implement the current detector 516 of FIG. 5 are shown in FIG. 24. The machine readable instructions 2400 process a measured current signal corresponding to current drawn from a power source coupled to an information presenting device (e.g., the display device 120 of FIG. 1), detected by an emission sensor (e.g., the emission sensor 212 of FIGS. 2 and 10) and input to the current detector 516. The machine readable instructions 2400 may be executed periodically (e.g., as part of a program loop) and/or aperiodically (e.g., in response to one or more events) to determine whether the monitored information presenting device is ON or OFF. The machine readable instructions 2400 begin execution at block 2404 at which the current detector 516 samples the input current signal. After sampling the input current signal, control proceeds to block 2408 at which the current detector 516 compares the sampled current signal to a predetermined threshold determined, for example, my measuring the amount of current drawn by the monitored information presenting device in an OFF or standby/sleep mode.

If at block 2408 the current detector 516 determines that the sampled current signal exceeds the threshold, control proceeds to block 2412 at which the current detector 516 determines the monitored information presenting device is ON. The current detector 516 makes such a determination because a current signal exceeding the predetermined threshold indicates that the monitored information presenting device is turned ON and drawing current from the associated power source. If, however, at block 2408 the current detector 516 determines that the current signal does not exceed the threshold, control proceeds to block 2416 at which the current detector 516 determines the monitored information presenting device is OFF. Here, the current detector 516 uses the lack of a significant current signal to decide that the monitored information presenting device is not operating in an active mode and, therefore, is turned OFF. In any case, after the current detector 516 makes a determination at block 2412 or block 2416, execution of the machine readable instructions 2400 ends.

Figure 25:
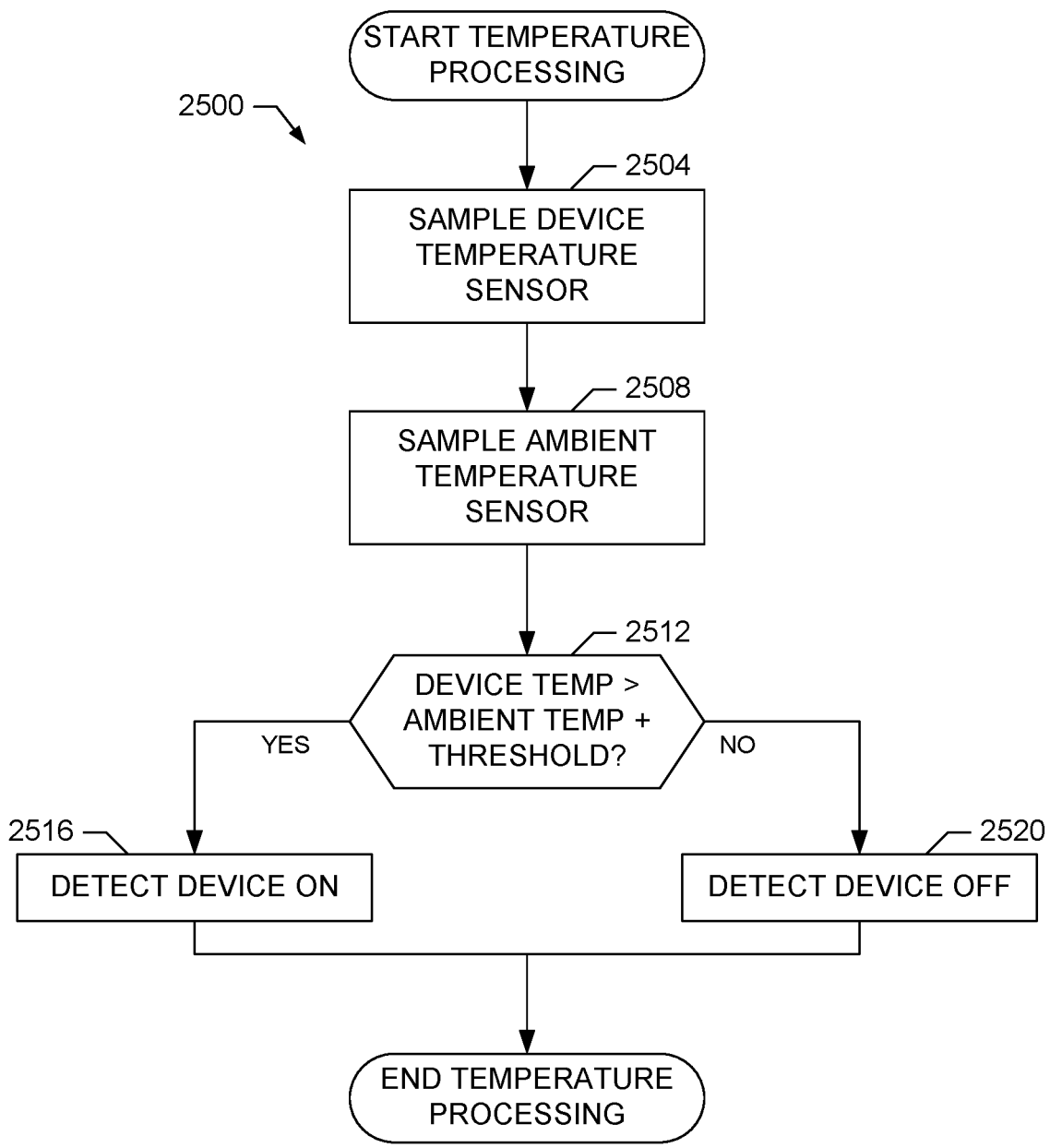
FIG. 25 is a flowchart representative of example machine readable instructions that may be executed to implement the example temperature detector of FIG. 5.

Example machine readable instructions 2500 that may be executed to implement the temperature detector 520 of FIG. 5 are shown in FIG. 25. The machine readable instructions 2500 process measured temperature measurements corresponding to heat emitted from an information presenting device (e.g., the display device 120 of FIG. 1), as well as possibly the ambient air temperature in a room in which the monitored information presenting device is located. The temperature measurements are detected by appropriately configured emission sensors (e.g., the emission sensors 212A-B of FIG. 11) and input to the temperature detector 516. The machine readable instructions 2500 may be executed periodically (e.g., as part of a program loop) and/or aperiodically (e.g., in response to one or more events) to determine whether the monitored information presenting device is ON or OFF. The machine readable instructions 2500 begin execution at block 2504 at which the temperature detector 520 samples the temperature signal generated by a first emission sensor positioned to permit measurement of the temperature of the monitored information presenting device. Next, control proceeds to block 2508 at which the temperature detector 520 samples the temperature signal generated by a second emission sensor positioned to permit measurement of the ambient air temperature.

After sampling of the respective temperature signals, control then proceeds to block 2512 at which the temperature detector 520 compares the monitored information presenting device's temperature to the ambient air temperature, possible offset by a threshold to improve ON/OFF detection reliability. If at block 2512 the temperature detector 520 determines that the monitored information presenting device's temperature sufficiently exceeds the ambient air temperature (based on the additional threshold amount), control proceeds to block 2516 at which the temperature detector 520 determines that the monitored information presenting device is ON. The temperature detector 520 makes such a determination because the monitored information presenting device's temperature indicates that heat is being emitted and, thus, that the device is turned ON. If, however, at block 2512 monitored information presenting device's temperature does not sufficiently exceed the ambient air temperature, control proceeds to block 2520 at which the temperature detector 520 determines the monitored information presenting device is OFF. Here, the temperature detector 520 uses the lack of a significant heat emission to decide that the monitored information presenting device is not operating in an active mode and, therefore, is turned OFF. In any case, after the temperature detector 520 makes a determination at block 2516 or block 2520, execution of the machine readable instructions 2500 ends. Persons of ordinary skill in the art will appreciate that the processing at step 2508 may be eliminated to reduce the number of required emission sensors if, for example, the threshold at block 2512 is modified to incorporate an expected/average ambient air temperature.

Figure 26:
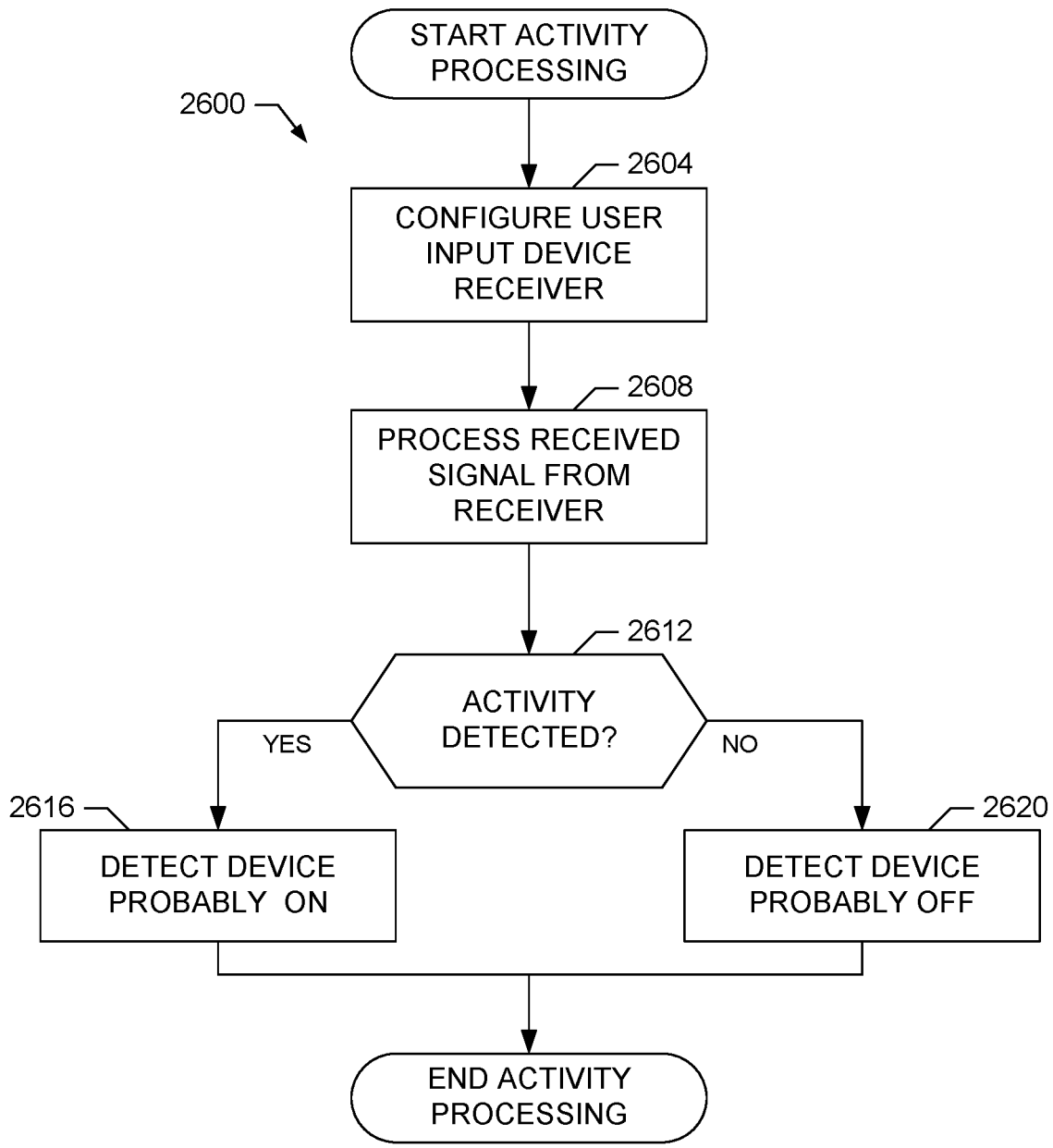
FIG. 26 is a flowchart representative of example machine readable instructions that may be executed to implement the example remote control activity detector and/or the people meter activity detector of FIG. 5.

Example machine readable instructions 2600 that may be executed to implement the remote control activity detector 524 and/or the people meter activity detector 528 of FIG. 5 are shown in FIG. 26. To simplify the description of FIG. 26, the remote control activity detector 524 and the people meter activity detector 528 will be referred to generally and collectively as the "remote input device activity detector 524/528." The machine readable instructions 2600 process control signals emitted by one or more remote input devices (e.g., the remote control device 160 and/or the people meter control device 164 of FIG. 1) associated with an information presenting device (e.g., the display device 120 of FIG. 1). The control signals are detected by appropriately configured emission sensors (e.g., the emission sensors 212 of FIG. 12A-B) and input to the remote input device activity detector 524/528. The machine readable instructions 2600 may be executed periodically (e.g., as part of a program loop) and/or aperiodically (e.g., in response to one or more events) to determine whether the monitored information presenting device is ON or OFF.

The machine readable instructions 2600 begin execution at block 2604 at which the remote input device activity detector 524/528 initializes/configures a receiver (e.g., the IR receiver 1204 of FIG. 12A, the wireless receiver 1254 of FIG. 12B and/or the ultrasonic receiver 1284 of FIG. 12C) which receives and transforms the control signals detected by the emission sensor into a form suitable for subsequent processing by the remote input device activity detector 524/528. After the receiver is appropriately configured, control proceeds to block 2608 at which the remote input device activity detector 524/528 processes the received control signals. If at block 2612 the remote input device activity detector 524/528 determines that the received control signals correspond to known and/or unknown remote input device activity, control proceeds to block 2616 at which the remote input device activity detector 524/528 determines that the monitored information presenting device is probably ON. For example, known activity could include power ON commands, channel change commands, volume change/mute commands, prompt responses, etc., whereas unknown activity could include a noticeable increase in IR, RF or ultrasonic energy, a cluster of received IR, RF or ultrasonic pulses, etc. The remote input device activity detector 524/528 makes such a determination at block 2616 because the receipt of control signals corresponding to known and/or unknown remote input device activity indicates that a user is probably operating and/or responding to an active information presenting device.

If, however, at block 2612 control signals corresponding to known and/or unknown remote input device activity are not detected, control proceeds to block 2620 at which the remote input device activity detector 524/528 determines the monitored information presenting device is probably OFF. Here, the remote input device activity detector 524/528 uses the lack of received control signals corresponding to known and/or unknown remote input device activity to decide that the monitored information presenting device is not being controlled and/or responded to by a user and, therefore, is probably turned OFF. In any case, after the remote input device activity detector 524/528 makes a determination at block 2616 or block 2620, execution of the machine readable instructions 2600 ends.

Figure 27:
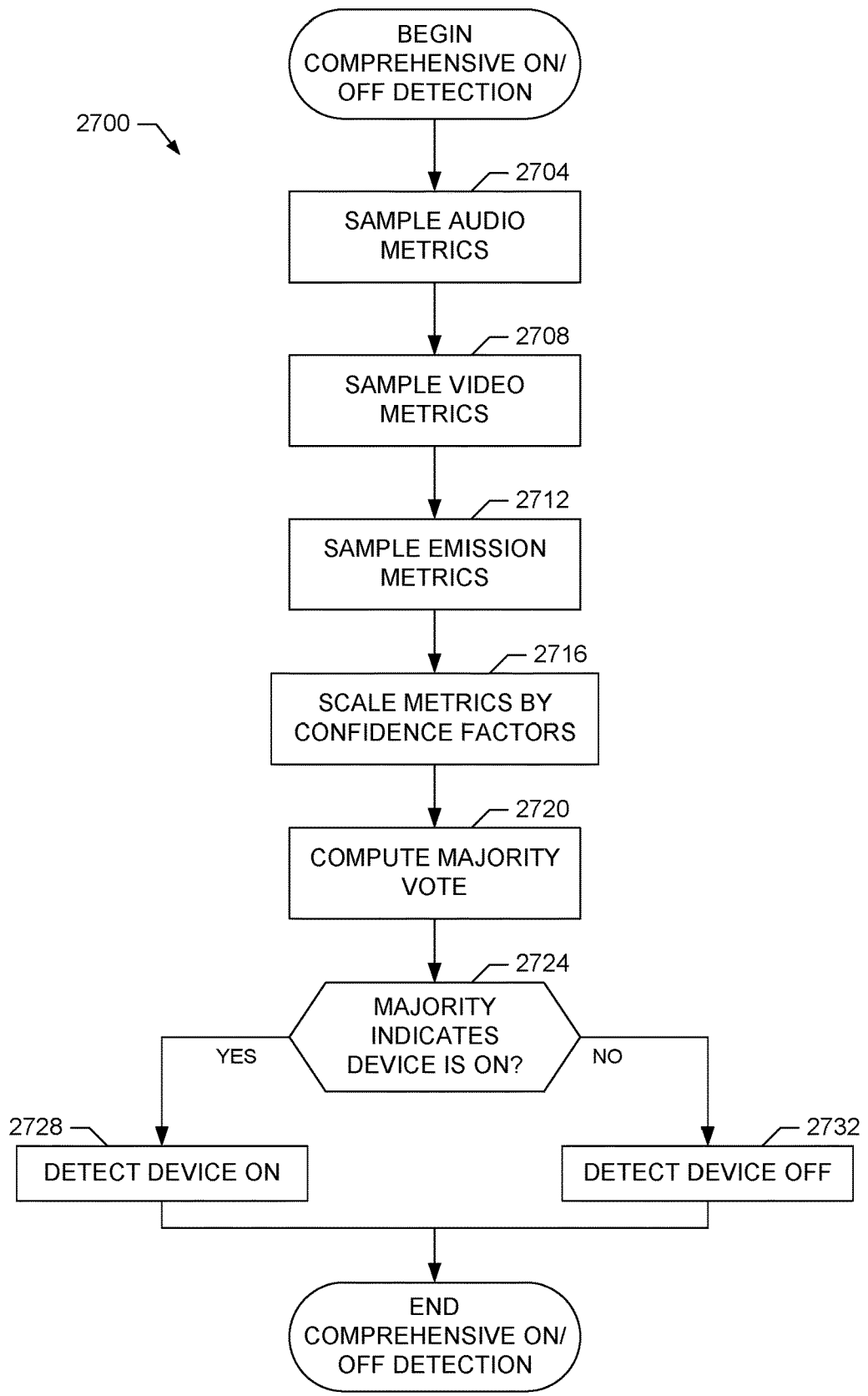
FIG. 27 is a flowchart representative of first example machine readable instructions that may be executed to implement the example decision processor of FIG. 2.

Example machine readable instructions 2700 that may be executed to implement the decision processor 244 of FIG. 2 are shown in FIG. 27. The machine readable instructions 2700 may be executed periodically (e.g., as part of a program loop) and/or aperiodically (e.g., in response to one or more events) to determine whether a monitored information presenting device (e.g., the display device 120 of FIG. 1) is ON or OFF. The machine readable instructions 2700 process, for example, the ON/OFF decision outputs 246, 248 and/or 250 generated by the audio processors 228, the video processors 232 and the emission processors 236, respectively, of FIG. 2. The individual audio processors 228, the video processors 232 and the emission processors 236 make autonomous decisions concerning whether a monitored information presenting device is turned ON or OFF. The machine readable instructions 2700 enable the decision processor 244 to combine the individual, autonomous ON/OFF decisions into a single, comprehensive decision regarding whether the monitored information presenting device is turned ON or OFF.

The machine readable instructions 2700 begin execution at block 2704 at which the decision processor 244 samples the audio decision outputs 246 (also called audio decision metrics 246) generated by the audio processors 228. Next, control proceeds to block 2708 at which the decision processor 244 samples the video decision outputs 248 (also called video decision metrics 248) generated by the video processors 232. Control then proceeds to block 2712 at which the decision processor 244 samples the emission decision outputs 250 (also called emission decision metrics 250) generated by the emission processors 236. Then, after all the decision metrics have been sampled, control proceeds to block 2716 at which the decision processor 244 weights the decision metrics by, for example, scaling or assigning a value to each decision metric corresponding to the confidence associated with the decision metric. For example, and referring to the examples of FIGS. 13-26 above, at block 2716 the decision processor 244 may assign a value of +1 to decision metric of "ON," a value of +0.5 to a decision metric of "probably ON," a value of −0.5 to a decision metric of "probably OFF" and a value of −1 to a decision metric of "OFF."

Next, control proceeds to block 2720 at which the decision processor 244 combines all of the individual decision metrics (e.g., via addition) to determine a weighted majority vote of the individual decisions made by the audio processors 228, the video processors 232 and the emission processors 236. Then, if at block 2724 the majority vote favors a decision that the monitored information presenting device is ON (e.g., if the weighted majority vote results in a positive value), control proceeds to block 2728 at which the decision processor 244 declares the monitored information presenting device to be ON. However, if at block 2724 the majority vote favors a decision that the monitored information presenting device is OFF (e.g., if the majority vote results in a negative value), control proceeds to block 2732 at which the decision processor 244 declares the monitored information presenting device to be OFF. In the case of a tie, the decision processor 244 may be configured, for example, to favor either a decision of ON or OFF depending on the particular monitored information presenting device, to produce an output indicating that the state of the monitored information presenting device is indeterminate, etc. In any case, after the decision processor 244 makes a determination at block 2728 or block 2732, execution of the machine readable instructions 2700 ends.

Figure 28:
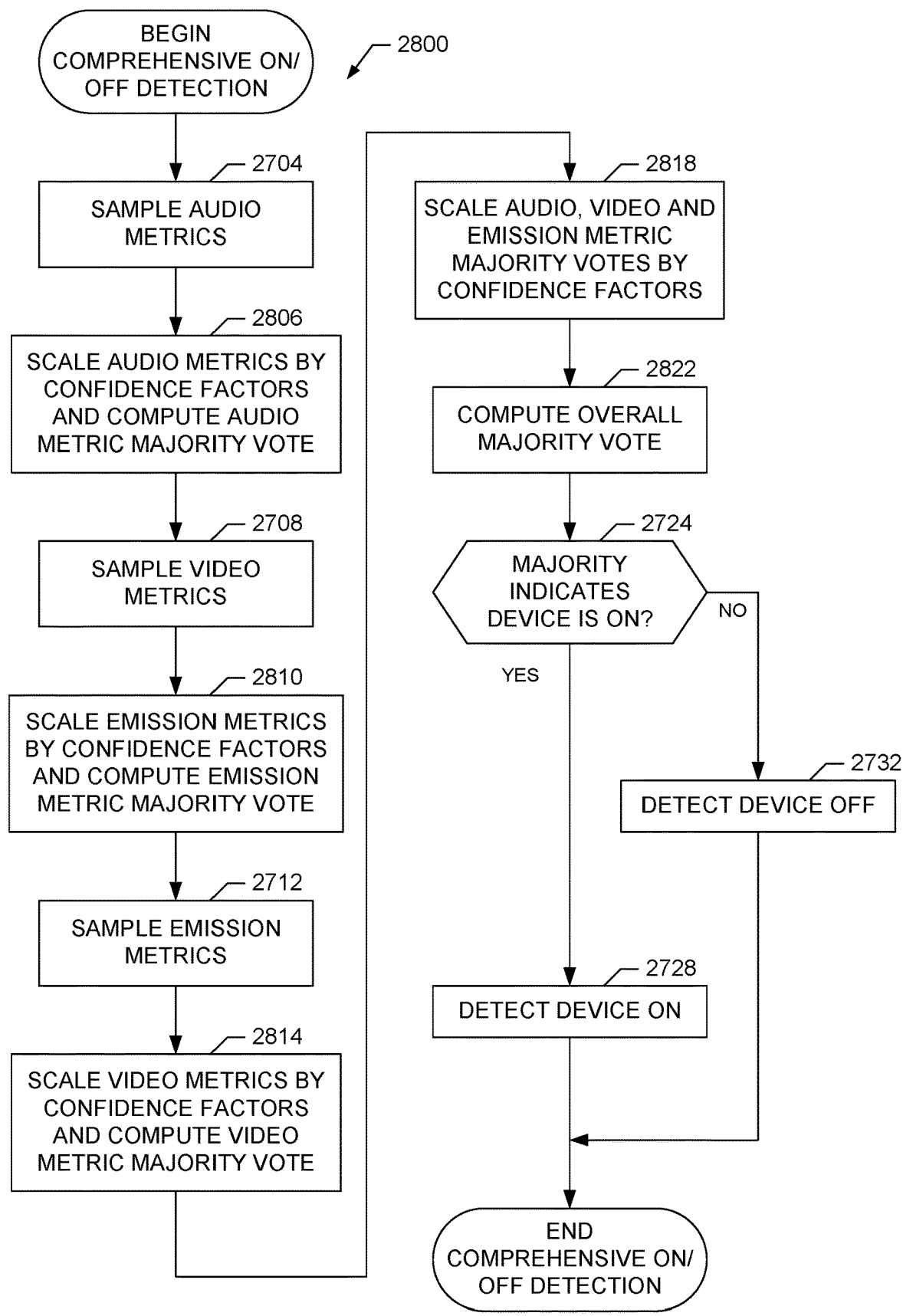
FIG. 28 is a flowchart representative of second example machine readable instructions that may be executed to implement the example decision processor of FIG. 2.

FIG. 28 illustrates second example machine readable instructions 2800 that may be executed to implement the decision processor 244 of FIG. 2. As in the case of the example machine readable instructions 2700 of FIG. 27, the machine readable instructions 2800 of FIG. 28 may be executed periodically (e.g., as part of a program loop) and/or aperiodically (e.g., in response to one or more events) to determine whether a monitored information presenting device (e.g., the display device 120 of FIG. 1) is ON or OFF. Furthermore, the machine readable instructions 2800 similarly process, for example, the ON/OFF decision outputs 246, 248 and/or 250 generated by the audio processors 228, the video processors 232 and the emission processors 236, respectively, of FIG. 2. As such, blocks having substantially equivalent functionality in the examples of FIGS. 27 and 28 are labeled with the same reference numeral. The interested reader is referred to the description of FIG. 27 above for a detailed description of these blocks.

Turning to the example of FIG. 28, the example machine readable instructions 2800 implement a two-stage weighted majority voting procedure, in contrast with the single-stage voting procedure implemented by the example machine readable instructions 2700 of FIG. 27. Specifically, after sampling the audio decision metrics 246 at block 2704, control proceeds to block 2806 at which the decision processor 244 computes a weighted majority vote of the audio decision metrics. The audio metric weighted majority vote may be computed at block 2806, for example, by scaling or assigning a value to each sampled audio decision metric 246 and then adding the resulting metrics to determine the audio metric weighted majority vote. Similarly, a video metric weighted majority vote and an emission metric weighted majority vote may be computed at blocks 2810 and 2814, respectively, after the corresponding video decision metrics and emission decision metrics are sampled at blocks 2708 and 2712 as shown.

Next, after processing at blocks 2806, 2810 and 2812 completes, control proceeds to block 2818 at which the decision processor 244 may further weight the individual audio, video and emission metric weighted majority votes based on, for example, the confidence and/or importance associated with the particular type of metric. Control then proceeds to block 2822 at which the decision processor 244 combines the resulting individual audio, video and emission metric weighted majority votes to determine an overall majority vote. Then, control proceeds to block 2724 and blocks subsequent thereto as discussed above in connection with FIG. 27 at which the decision processor 244 uses the overall weighted majority vote to decide whether the monitored information presenting device is turned ON or OFF. Execution of the machine readable instructions 2800 then ends.

Persons of ordinary skill in the art will appreciate that the examples of FIGS. 27 and 28 are but two techniques contemplated by the disclosure herein for combining the ON/OFF decision outputs 246, 248 and/or 250 generated by, respectively, the audio processors 228, the video processors 232 and the emission processors 236. As another example, the decision processor 244 could combine the ON/OFF decision outputs 246, 248 and/or 250 based on whether a particular decision output corresponds to a presentation by the monitored information presenting device or whether the decision output corresponds to a physical operation of the information presenting device. In such an example, a first weighted majority vote corresponding to the presentation by the monitored information presenting device could be computed from, for example, the decision outputs from any or all of the audio code detector 312, the audio signature processor 316, the audio gain level processor 320, the quiet time detector 332, the audio source detector 336, the visible light rhythm processor 412 and/or the display activity detector 416. A second weighted majority vote corresponding to the physical operation of the monitored information presenting device could be computed from, for example, the decision outputs from any or all of the horizontal sync audio processor 324, the fan noise detector 332, the EM field detector 512, the current detector 516, the temperature detector 520, the remote control activity detector 524 and/or the people meter activity detector 528. Then, the first and second weighted majority votes could be combined to generate an overall majority vote to determine whether the monitored information presenting device is turned ON or OFF.

Figure 29:
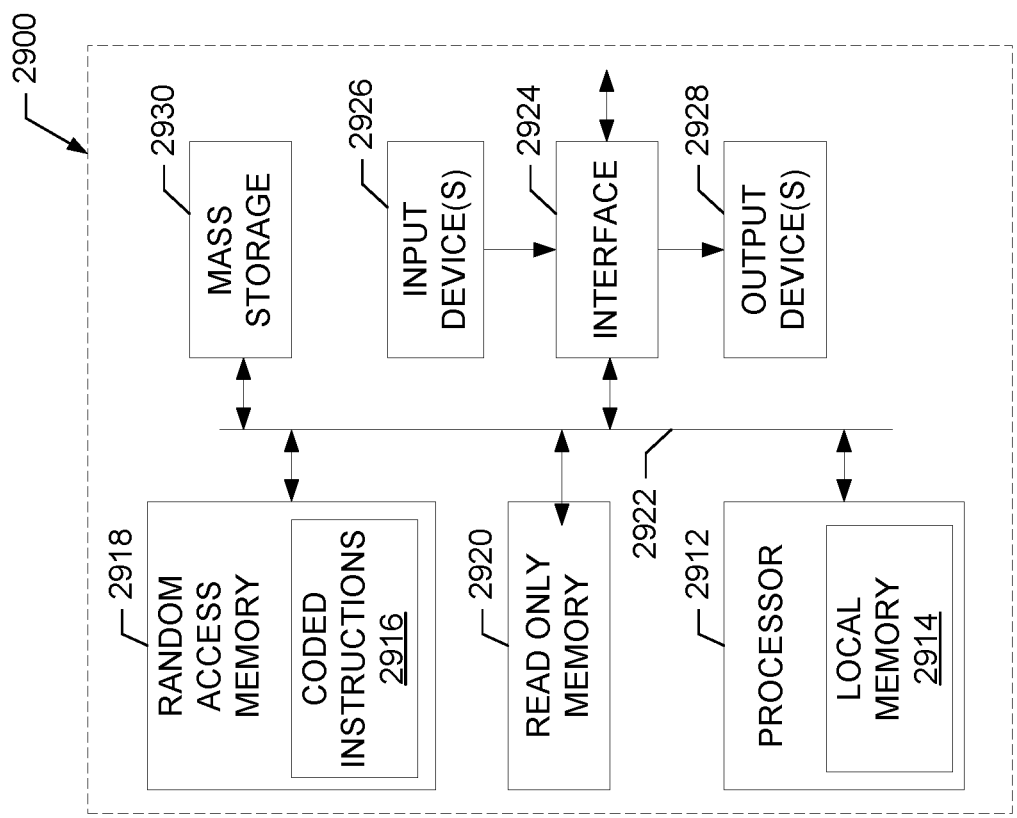
FIG. 29 is a block diagram of an example computer that may execute the example machine readable instructions of FIGS. 13-26 and/or 27 to implement the example display device ON/OFF detector of FIG. 2.

FIG. 29 is a block diagram of an example computer 2900 capable of implementing the apparatus and methods disclosed herein. The computer 2900 can be, for example, a server, a personal computer, a personal digital assistant (PDA), an Internet appliance, a DVD player, a CD player, a digital video recorder, a personal video recorder, a set top box, or any other type of computing device.

The system 2900 of the instant example includes a processor 2912 such as a general purpose programmable processor. The processor 2912 includes a local memory 2914, and executes coded instructions 2916 present in the local memory 2914 and/or in another memory device. The processor 2912 may execute, among other things, the machine readable instructions represented in FIGS. 13 through 28 and/or implement any or all of the processors 612, 712, 812, 912, 1012, 1112, 1212, 1262 and/or 1292. The processor 2912 may be any type of processing unit, such as one or more microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 2912 is in communication with a main memory including a volatile memory 2918 and a non-volatile memory 2920 via a bus 2922. The volatile memory 2918 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2920 may be implemented by flash memory and/or any other desired type of memory device. Access to the main memory 2918, 2920 is typically controlled by a memory controller (not shown) in a conventional manner.

The computer 2900 also includes a conventional interface circuit 2924. The interface circuit 2924 may be implemented by any type of well known interface standard, such as an Ethernet interface, a universal serial bus (USB), and/or a third generation input/output (3GIO) interface.

One or more input devices 2926 are connected to the interface circuit 2924. The input device(s) 2926 permit a user to enter data and commands into the processor 2912. The input device(s) can be implemented by, for example, a keyboard, a mouse, a touchscreen, a track-pad, a trackball, an isopoint and/or a voice recognition system.

One or more output devices 2928 are also connected to the interface circuit 2924. The output devices 2928 can be implemented, for example, by display devices (e.g., a liquid crystal display, a cathode ray tube display (CRT)), by a printer and/or by speakers. The interface circuit 2924, thus, typically includes a graphics driver card.

The interface circuit 2924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 2900 also includes one or more mass storage devices 2930 for storing software and data. Examples of such mass storage devices 2930 include floppy disk drives, hard drive disks, compact disk drives and digital versatile disk (DVD) drives. The mass storage device 2930 may be used, for example, store any or all of the machine readable instructions 1300, 1400, 1500, 1600, 1700, 1800, 1900, 2000, 2100, 2200, 2300, 2400, 2500, 2600, 2700 and/or 2800. Additionally, the volatile memory 1518 may be used, for example, to store any or all of the audio decision metrics 246, the video decision metrics 248 and/or the emission decision metrics 250.

At least some of the above described example methods and/or apparatus are implemented by one or more software and/or firmware programs running on a computer processor. However, dedicated hardware implementations including, but not limited to, application specific integrated circuits (ASICs), programmable logic arrays (PLAs) and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
   generating an audio signature based on an audio signal of media content presented on a presentation device;
   determining that an operating state of the presentation device is an ON state based on an indication that the audio signature matches a reference signature of a set of reference signatures corresponding to a set of known media content; and
   augmenting a viewing record of the media content based on the audio signature matching the reference signature.

2. The method of claim 1, further comprising:
   providing the ON state of the presentation device to a metering unit coupled to the presentation device and which monitors the media content presented on the presentation device.

3. The method of claim 2, further comprising:
generating, at the metering unit, viewing records including the viewing record of the media content presented on the presentation device; and
transmitting, from the metering unit, the viewing records to a data processing facility.

4. The method of claim 3, wherein the viewing record is representative of a determination, by the metering unit, that the media content was presented on the presentation device.

5. The method of claim 1, further comprising:
determining that the audio signal is not indicative of silence or background noise, wherein the determining that the operating state of the presentation device is the ON state is based further on the determining that the audio signal is not indicative of silence or background noise.

6. The method of claim 1, further comprising:
determining that an audio gain level does not exceed an audio gain threshold, wherein the determining that the operating state of the presentation device is the ON state is based further on the determining that the audio gain level does not exceed the audio gain threshold.

7. The method of claim 1, wherein generating the audio signature comprises detecting, at an audio sensor, the audio signal of the media content.

8. The method of claim 7, wherein the audio sensor is a microphone.

9. A computing system comprising:
a sensor configured to detect an audio signal based on an audio output of a presentation device;
at least one memory storing computer-readable instructions; and
at least one processor configured to execute the computer-readable instructions to perform operations comprising:
generating an audio signature based on the audio signal of media content presented on the presentation device;
determining that an operating state of the presentation device is an ON state based on an indication that the audio signature matches a reference signature of a set of reference signatures corresponding to a set of known media content; and
augmenting a viewing record of the media content based on the audio signature matching the reference signature.

10. The computing system of claim 9, the operations further comprising:
providing the ON state of the presentation device to a metering unit coupled to the presentation device and which monitors the media content presented on the presentation device.

11. The computing system of claim 10, the operations further comprising:
generating, at the metering unit, viewing records including the viewing record of the media content presented on the presentation device; and
transmitting, from the metering unit, the viewing records to a data processing facility.

12. The computing system of claim 11, wherein the viewing record is representative of a determination, by the metering unit, that the media content was presented on the presentation device.

13. The computing system of claim 9, the operations further comprising:
determining that the audio signal is not indicative of silence or background noise, wherein the determining that the operating state of the presentation device is the ON state further is based further on determining that the audio signal is not indicative of silence or background noise.

14. The computing system of claim 9, the operations further comprising:
determining that an audio gain level does not exceed an audio gain threshold, wherein the determining that the operating state of the presentation device is the ON state is based further on determining that the audio gain level used does not exceed the audio gain threshold.

15. The computing system of claim 9, wherein generating the audio signature comprises detecting, at the sensor, the audio signal of the media content.

16. The computing system of claim 15, wherein the sensor is a microphone.

17. A non-transitory computer-readable medium storing computer-readable instructions that, when executed, cause at least one processor to perform operations comprising:
generating an audio signature based on an audio signal of media content presented on a presentation device;
determining that an operating state of the presentation device is an ON state based on an indication that the audio signature matches a reference signature of a set of reference signatures corresponding to a set of known media content; and
augmenting a viewing record of the media content based on the audio signature matching the reference signature.

18. The non-transitory computer-readable medium of claim 17, the operations further comprising:
generating, at a metering unit, viewing records including the viewing record of the media content regarding presented on the presentation device; and
transmitting, from the metering unit, the viewing records to a data processing facility.

19. The non-transitory computer-readable medium of claim 17, wherein generating the audio signature comprises detecting, at an audio sensor, the audio signal of the media content.

20. The non-transitory computer-readable medium of claim 19, wherein the audio sensor is a microphone.

* * * * *